US006801210B2

(12) United States Patent
Yomdin et al.

(10) Patent No.: US 6,801,210 B2
(45) Date of Patent: Oct. 5, 2004

(54) METHOD AND APPARATUS FOR IMAGE REPRESENTATION BY GEOMETRIC AND BRIGHTNESS MODELING

(75) Inventors: Yosef Yomdin, Rehovot (IL); Yoram Elichai, Lehavim (IL)

(73) Assignee: Vimatix (BVI) Ltd. (VG)

( * ) Notice: Subject to any disclaimer, the term of this patent is extended or adjusted under 35 U.S.C. 154(b) by 422 days.

(21) Appl. No.: 09/902,643

(22) Filed: Jul. 12, 2001

(65) Prior Publication Data

US 2003/0011622 A1 Jan. 16, 2003

(51) Int. Cl.$^7$ .............................................. G06T 15/00
(52) U.S. Cl. ...................................................... 345/581
(58) Field of Search ................... 345/581; 382/199–204

(56) References Cited

U.S. PATENT DOCUMENTS

| | | |
|---|---|---|
| 5,410,643 A | 4/1995 | Yomdin et al. |
| 5,510,838 A | 4/1996 | Yomdin et al. |
| 5,793,895 A | 8/1998 | Chang et al. |
| 5,960,118 A | 9/1999 | Briskin et al. |
| 6,008,820 A | 12/1999 | Chauvin et al. ............ 345/502 |
| 6,040,864 A | 3/2000 | Etoh |
| 6,121,975 A | 9/2000 | Mungenast et al. ......... 345/588 |
| 6,181,816 B1 | 1/2001 | Adams, Jr. et al. ......... 382/162 |
| 6,233,017 B1 | 5/2001 | Chaddha |
| 6,300,960 B1 | 10/2001 | DeRose et al. |
| 2003/0012441 A1 * | 1/2003 | Trifonov et al. ............ 382/199 |

OTHER PUBLICATIONS

J. Elder et al., "Image Editing in the Contour Domain," 1998 IEEE (pp. 374–381).
Y. Yomdin et al., "Normal Forms Representation", SPIE vol. 1903 Image and Video Processing, pp. 204–214(1993).

M. Briskin et al., "How Can Singularity Theory Help in Image Processing?".

A. Blake et al., "Active Contours" Springer–Verlag, London (1998); ISBN 3–540–76217–5, Chapters 2 and 5 (pp. 25–37 and 97–113).

J. Foley, et al., "Computer Graphics: Principles and Practice" Addison–Wesley Publishing Co. New York (1997) (2d ed, Jul. 1997), Chapter 17 (pp. 815–853).

R. Gonzales et al., "Digital Image Processing" Addison–Wesley Publishing Co. New York (1992) Chapters 7.1–7.3.4 (pp. 413–452).

Amini, "Model Analysis of Red Blood Cell Flow Through Diverging and Converging Microvascular Bifurcations," The George Washington University, 1994.

"Normal Forms Representation: A Technology for Image Compression", Proceedings SPIE–The International Society for Optical Engineering, vol. 1903, Feb. 3–4, 1993, pp. 204–214.

\* cited by examiner

*Primary Examiner*—Michael Razavi
*Assistant Examiner*—Motilewa Good-Johnson
(74) *Attorney, Agent, or Firm*—Fenster & Company

(57) ABSTRACT

A method for representing an image includes identifying characteristic lines of the image and the visual relationships among the characteristic lines. The visual relationships include proximities and crossings of the characteristic lines. The method further includes defining a background of the image, the background including a slow-scale background, background patches and background textures. Mathematical models representing the characteristic lines, the visual relationships among the characteristic lines and the background, respectively, are assembled and aggregated.

22 Claims, 35 Drawing Sheets

CORE Process

CORE Process

Adjacency inside one characteristic line

Proximity between two characteristic lines

Identify Proximities

Processing Proximity Spline Segments

Approximate Proximity Intervals by Mathematical Models

Identify Crossing

Identify Elementary Crossings

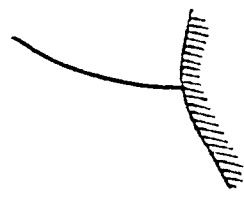
Fig. 12a
Image pattern
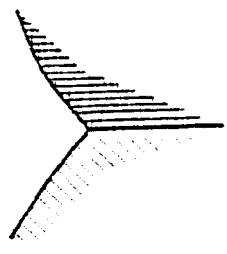
Fig. 12b
Image pattern
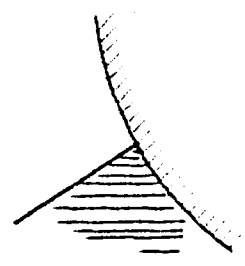
Fig. 12c
Image pattern
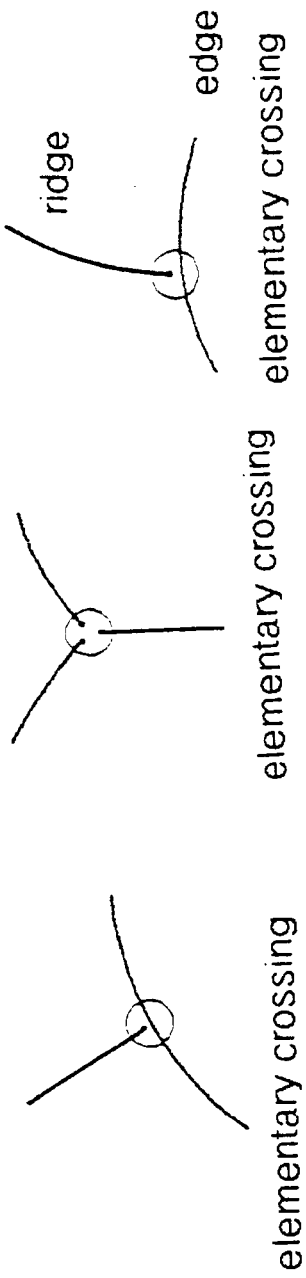

Identify Second Order Crossings

Slow-Scale Background

Signal Expansion Algorithm

Identify Patches

Closed characteristic line

Patches

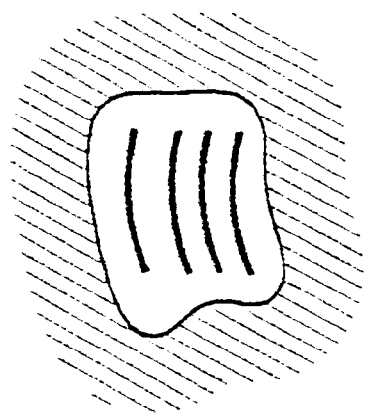
Fig. 23c
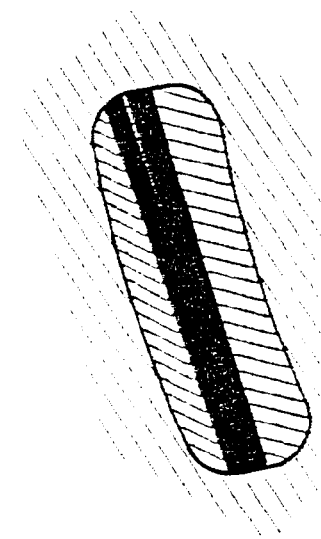
Fig. 23b
R
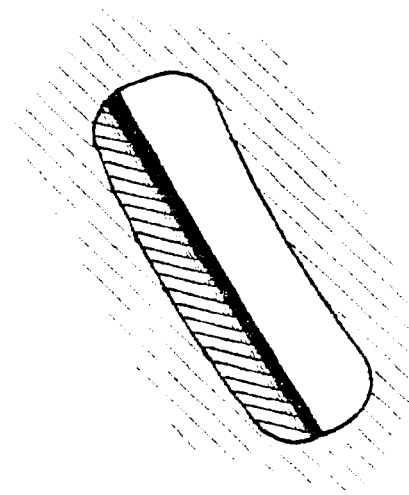
Fig. 23a

Capture Textures

Reconstruction Algorithm

Aggregating Mathematical Models

Globalization

Globalization (cont.)

Deformed edge

Two edges

Cross-section Ridge

Localization

X-rays

Usual light

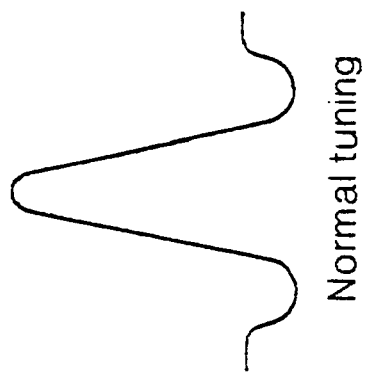
Fig. 33b Normal tuning
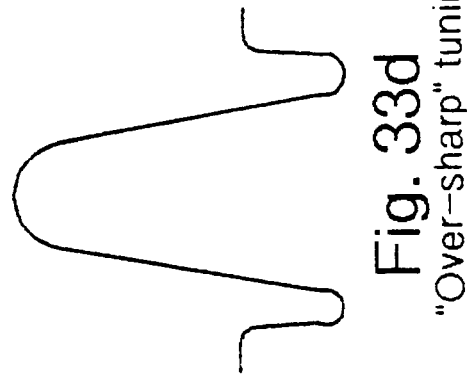
Fig. 33d "Over-sharp" tuning
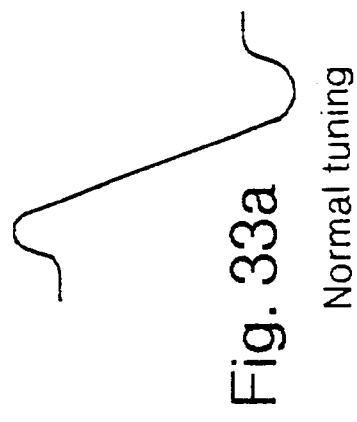
Fig. 33a Normal tuning
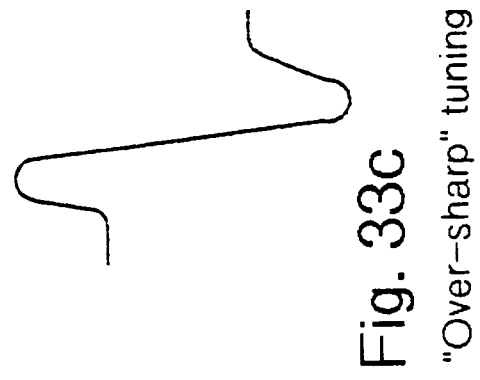
Fig. 33c "Over-sharp" tuning

METHOD AND APPARATUS FOR IMAGE REPRESENTATION BY GEOMETRIC AND BRIGHTNESS MODELING

BACKGROUND OF THE INVENTION

1. Field of the Invention

The present invention relates to the field of image representation. More particularly, the present invention relates to a method of representing images using mathematical models of geometric and brightness characteristics of the image, known as Content Oriented Representation ("CORE").

2. Background Information

Analysis and processing of digital images play an important role in nearly all disciplines of modern industry and economic activity. From medical imaging to industrial quality control and diagnostics, to entertainment and advertising, efficient image analysis, representation and processing is the primary component of overall imaging system performance.

Presently, there are forms of content-oriented representation of images known in the field of image representation. Partial implementations exist, known generally as "vector formats" and "vectorizations," which are representations of visual images by geometric entities, such as vectors, curves, and the like. Usually, vectorized images are significantly more compact and easier to process than identical images represented by conventional techniques relying on use of pixels, for example.

Currently available products incorporate limited vector formats, including for example, "Photoshop," developed by Adobe Systems Incorporated, "Flash" and "Shockwave," developed by Macromedia, Inc., and W3C Scalable Vector Graphics (SVG). However, vectorization methods employed by these products provide cartoon-like images and animations. In other words, they fail to adequately represent high resolution, photo-realistic images of the real world. This is because only simple, cartoon-like images allow for representation by edge partitions, which are not necessarily present in typical photo-realistic images. In contrast, high resolution, real world pictures present an enormous variety of forms and highly complex visual patterns, which conventional vectorization methods fail to capture. In fact, high resolution, real world images present such an enormous variety of forms and complex visual patterns, that visually accurate vectorization is practically impossible under the existing methods.

Existing vectorization techniques are confined by certain limitations, which must be overcome to adequately provide content-oriented representation of high resolution photo realistic images. The basic requirements of effective image representation include the following: (i) the resulting image has no visible distortions; (ii) the number of parameters in the resulting image is an order of magnitude less than the number of pixels in the original image; (iii) the parameters have simple visual interpretations; (iv) all reasonable image transformations are expressible in terms of the representation parameters, so that all the image processing operations are possible; and (v) with respect to video sequences and video compression, subsequent frames of the resulting image behave coherently, such that the models remain basically the same, while only respective geometric parameters change continuously.

Although the existing methods of image representation, processing and compression, such as DCT transform and the JPEG compression standard, as well as various wavelets transforms and compression schemes, may satisfy the first requirement above, they fail with respect to the remaining four requirements. Current methods of image representation are based on linear transformations of the image to a certain basis, which contains initially the same number of elements as the number of pixels in the original image. Subsequent quantization and filtering reduces the number of parameters, but in an unpredictable fashion. Also, visual interpretation of the reduced number of parameters may be difficult.

Moreover, because video sequences represent exactly the motion of certain objects and patterns (i.e., geometric transformations of the initial scene), the DCT or the wavelets representations of video sequences behave in an incoherent and unpredictable manner. Therefore, existing video compression techniques, such as MPEG, use JPEG compression for the first frame and perform motion compensation on a pixel level, as opposed to a compressed data level. This results in a tremendous reduction in efficiency.

A method for image representation and processing is described by James H. Elder and Rick M. Goldberg in "Image Editing in the Contour Domain," IEEE (1998), based on edge capturing, together with the "blur scale" and the brightness values. Although providing additional efficiency to image representation and processing in the "geometric image domain," the disclosed method does not solve the main problems of the existing methods. In particular, the method relies on only edges, while ignoring more complicated characteristic lines. Likewise, the method ignores possible geometric proximities and crossings between edges. Reconstruction of brightness values between the edges relies on solving Laplace transform equations, which appears to be an ad hoc operation that does not take into account actual image brightness. Furthermore, the method does not include any tools for representing background and texture visual patterns. The geometric accuracy of the suggested edge detection method (i.e., marking the nearest pixel and edge direction) is not sufficient for a faithful image reconstruction. Lastly, the ad hoc Gaussian blur model does capture the actual cross-sections of the edges.

Advances in vectorization of high resolution images, however, have continued to evolve. For example, U.S. Pat. No. 5,410,643 to YOMDIN et al., the disclosure of which is expressly incorporated herein by reference in its entirety, describes a method for image data representation by mathematical models of a certain type. However, the visual quality and compression ratio is low and image processing on the compressed data is impractical. In U.S. Pat. No. 5,510,838 to YOMDIN et al., the disclosure of which is expressly incorporated herein by reference in its entirety, the images are represented by four types of models: edges, ridges, hills and background. Edges and ridges are represented by mathematical models that include polygonal lines representing the center lines of the edges or ridges and the corresponding brightness (or color) profiles. The brightness profiles are kept at the vertices of the polygonal lines and interpolated along segments of these lines. Hills, which correspond to small patches on the image, are represented by paraboloid-like mathematical models. Background is represented by low degree polynomials placed on a predetermined artificial grid.

More particularly, U.S. Pat. No. 5,510,838 discloses a method for detection of edges, ridges, hills and background, based on approximation of the image by second and third order polynomials on overlapping 4×4 and 5×5 pixels cells and further analysis of these polynomials. This method provides better quality and compression than the method disclosed in U.S. Pat. No. 5,410,643, for example. However, the image quality and resolution are not sufficient for most practical applications, the compression ratio is inferior to that of other conventional methods and processing the compressed data is cumbersome and complicated.

Other practical disadvantages of the invention disclosed in the U.S. Pat. No. 5,510,838 include the following: (i) the image is subdivided into cells of a size of 6 to 48 pixels, which cells are represented independently, thereby reducing image quality and the compression ratio; (ii) there is no accounting for visual adjacencies between the models; (iii) approximation of edges and ridges by polygonal lines causes visual degradation (e.g., a "staircase effect"); (iv) the resolution of the detection method is insufficient due to second degree polynomial approximations on 4×4 pixel windows; (v) representation of the background is unstable and inefficient, resulting in visual degradation of the image, low compression and cumbersome processing; and (vi) the only tool for representing background textures, which are areas of dense fine scale patterns of low visual significance, is combining a large number of hills, resulting in visual degradation and significant reduction in compression, especially for images with rich textures.

Some of the problems identified above were addressed in U.S. Pat. No. 5,960,118, to BRISKIN et al., the disclosure of which is expressly incorporated herein by reference in its entirety. For example, basic visual adjacencies between the image models were introduced. Also, polygonal approximation of edges and ridges were replaced by second order splines. Also, 4×4 pixel windows were replaced by 3×3 pixel windows in the original polynomial approximation. U.S. Pat. No. 5,960,118 also discloses a completely new method for representing, compressing and rendering photo realistic 3D-virtual worlds. As a result, both image quality and compression ratio were improved. However, U.S. Pat. No. 5,960,118 did not eliminate the necessity of subdividing images into cells of 6 to 48 pixels. Also, representation of background and textures is still problematic.

One major problem continues to be that the conventional methods only provide a "semi-local" image representation based on mathematical models and fail to provide "global" representation of the entire image. As stated above, the initial steps include subdividing the image into cells between 6 to 48 pixels in size (e.g., about 20 pixels) and representing the image completely independently in each cell. Dissecting the image into independent blocks causes significant disadvantages and significantly reduces processing efficiency. The process effectively renders each cell a basic element of the image representation, yet the cells are completely artificial in nature (e.g., the cells have no relation to the original image itself and do not represent any perceivable visual pattern).

The artificial separation of the image into cells is detrimental in all applications of vectorized images. With respect to compression, for example, most edges and ridges on an image are longer than a single cell. Therefore, representation of the edges and ridges must be divided into segments having end points at the cell boundaries. These end points must be memorized, even though they have no visual significance, requiring additional computer storage. Moreover, splitting edges and ridges into segments precludes the possibility of taking into account global geometric correlations of data along these curves. Similarly, subdivision of an image into cells requires explicit treatment of the connected components of background elements inside each cell. This introduces complicated geometric patterns, which are completely irrelevant to the original image.

With respect to quantization of parameters, subdivision into cells requires quantization to be performed on each cell separately. This may result in different quantizations of color and geometric parameters in adjacent cells, which result in visual discontinuities between the adjacent cells even for relatively fine quantization steps. (It is well known that human visual perception is highly sensitive to discontinuities along simple lines, such as cell boundaries). All conventional representation methods based on cell subdivision, share this disadvantage. For example, JPEG compression has a "blocking effect," apparent even for relatively fine quantization of the coefficients.

Also, separation into cells negatively affects geometric transformations. It is well known that continuous geometric transformations never respect the predefined subdivision of an image into cells. An attempt to express such transformations on the cell level leads to the necessary introduction of cell intersections and "geometrically deformed" cells. This procedure is complex and often fails in the initial stages, making geometric processing of cell subdivisions virtually impossible.

The present invention overcomes the problems associated with the prior art, as described below.

SUMMARY OF THE INVENTION

In view of the above, the present invention through one or more of its various aspects and/or embodiments is presented to accomplish one or more objectives and advantages, such as those noted below.

The present invention overcomes the shortcomings of existing image representation techniques based on vectorization. It provides a complete content-oriented representation of high resolution, photo-realistic images. It further provides an efficient tool for mainstream imaging applications, including mathematical model representation without visible distortions of captured images. Furthermore, the representation involves an order of magnitude fewer parameters, having simple visual interpretations, than the number of pixels in the original image.

In the applications of the present invention, image processing operations, such as pattern definition, detection and separation, image analytic continuation and completion, are completely based on geometric and visual integrity of characteristic lines. They depend on the assumption that geometric and color patterns of the models faithfully represent visual patterns that actually exist on the image itself. Consequently, the present invention enables operations that are impossible under methods requiring artificial separation of the image into cells.

An aspect of the present invention provides a method for representing an image that includes identifying multiple characteristic lines of the image, identifying visual relationships among the characteristic lines, which include proximities and crossings, and defining a background of the image, which includes a slow-scale background and background patches. The method may further include assembling mathematical models that represent the characteristic lines, the visual relationships and the background, respectively. The mathematical models representing the characteristic lines are aggregated with the mathematical models representing the visual relationships among the characteristic lines and with the background of the image. The data representing the mathematical models may then be stored, transmitted and/or processed.

According to an aspect of the present invention, the proximities are identified by identifying boundary lines corresponding to each of the characteristic lines and approximating each boundary line by spline curves. Each spline curve is subdivided into multiple spline segments, each spline segment being less than a predetermined number of pixels in length. The spline segments are processed to determine and mark couples of joined spline segments. Proximity intervals are then defined based on at least one chain of couples. Further, each proximity interval may be represented by a proximity interval center line that adjoins boundaries of the proximity interval. A mathematical model of the proximity interval can be determined based on the mathematical model of a proximity interval characteristic line defined by the proximity interval center line.

According to an aspect of the present invention, the crossings are identified by identifying elementary crossings, first order crossings, second order crossings and proximity crossings. Identification of the elementary crossings is based on at least geometric adjacencies among endpoints and spline segments of multiple edges and ridges. Identification of the first order crossings is based on at least a detection of intersecting characteristic lines among the characteristic lines of the image. Identification of the second order crossings is based on at least a detection of identified first order crossings within a predetermined distance of one another. Identification of the proximity crossings is based on proximities that are less than a predetermined distance in length. Mathematical models of the various identified crossings are determined based on mathematical models of the characteristic lines that form the crossings.

According to another aspect of the present invention, the slow-scale background of the image is identified by constructing a background grid, which includes fixing a resolution of the background grid and identifying multiple points within the background grid. Approximating polynomials representative of each of the points within the background grid is constructed based on a predetermined degree for the polynomials. The mathematical model representing the slow-scale background includes the multiple points and the corresponding approximating polynomials.

Identifying the multiple points within the background grid may include a signal expansion algorithm. The signal expansion algorithm includes identifying a boundary of the slow-scale background, dividing the background boundary into subpieces having a predetermined length and including in the background grid the boundary endpoints associated with each of the subpieces. In addition, multiple points to be included in the background grid are identified, each point being at least a first predetermined distance from all of the other points and the boundary endpoints. Location data is transferred from each point and each boundary endpoint to data structures of neighboring points, which include all other points of the multiple points, all other boundary endpoints and pixels that are located within a second predetermined distance of each point and each boundary endpoint. The transferred location data is stored in relation to the neighboring points in the receiving data structures.

The brightness of the background of the image may be reconstructed, which includes retrieving for each point within the background grid the corresponding approximating polynomial and performing a signal expansion algorithm for each point without crossing boundaries corresponding to the characteristic lines of the image. A brightness value correlating to each point is computed and translated to a corresponding pixel of the represented image.

According to an aspect of the present invention, the background patches of the image are identified by identifying closed characteristic lines that enclose an area less than or equal to a predetermined size, and short characteristic lines that have a length less than or equal to a predetermined distance. Also, fine scale patches are identified, which includes convoluting the image through a Gaussian filter, identifying at least one of a local maximum value and a local minimum value, and approximating a fine scale patch shape around the local maximum value and/or the local minimum value. The background patches may be approximated as mathematical models by determining mathematical models corresponding to the identified closed characteristic lines and the identified short characteristic lines. The fine scale patches are identified as mathematical models by determining corresponding mathematical models of at least one of a re-scaled Gaussian function and a re-scaled paraboloid.

Representing the background of the image may further include identifying textures. Identifying textures includes identifying patches in the background, marking pixels located within the identified patches, constructing polynomials based on a least square approximation of a brightness value of pixels that have not been marked as being located within the identified patches and filtering out selected patches based on a predetermined size limit and a difference between a brightness of the patches and a brightness of the slow-scale background at each of the points within the patches. The patches other than the filtered out patches are aggregated with the constructed polynomials. A difference between a brightness of the aggregated patches and a brightness of the image is determined to form a residual background, which is represented via a wavelets system.

Another aspect of the present invention provides a method for representing an image including identifying multiple characteristic lines of the image and identifying proximities between at least two of the characteristic lines based on a chain of coupled spline segments, which are derived from boundary lines corresponding to each of the at least two characteristic lines and are less than a predetermined length. The method further includes identifying crossings between at least two of the characteristic lines. The crossings include elementary crossings based on at least geometric adjacencies among endpoints of edges and ridges, first order crossings based on at least a detection of the plurality of characteristic lines, and second order crossings based on at least an image pattern that is common to more than one of the identified first order crossings. A slow-scale background of the image is identified based on a signal expansion algorithm performed on multiple points within a background grid and corresponding approximating polynomials representative of each of the points within the background grid. Background patches of the image are identified based on identifying of at least one of closed characteristic lines enclosing an area less than a predetermined size and short characteristic lines having a length less than a predetermined distance. Mathematical models corresponding to the characteristic lines, the proximities, the crossings, the slow-scale background and the background patches are determined and aggregated to represent the image.

The method for representing an image may further include defining textures, which includes marking pixels located within the identified patches, constructing polynomials based on a least square approximation of brightness values corresponding to pixels that have not been marked, and filtering out selected patches based on size and brightness parameters. The patches not filtered out are aggregated with the constructed polynomials. A difference between a brightness of the aggregated patches and a brightness of the image is determined to form a residual background, which is represented by a wavelets system.

Another aspect of the present invention provides a method for globally representing an image. The method includes covering the image with multiple overlapping subsections, each subsection having a predetermined size and shape, wherein the size is greater than or equal to a locality size. Each subsection is processed independently, which includes identifying characteristic lines in the subsection, identifying visual relationships among the characteristic lines (e.g., proximities and crossings) and assembling mathematical models representing the characteristic lines and the visual relationships, respectively. The mathematical models representing the characteristic lines are aggregated with the mathematical models representing the visual relationships among the characteristic lines. The method further includes determining for each of the characteristic lines in each overlapping portion of the subsections whether a non-conforming model exists for the same characteristic line in the overlapping portion and interpolating among the non-conforming models. A background of the subsections is defined, which includes slow-scale background and background patches. The overlapping portions of the subsections are filtered.

Interpolating among non-conforming models in each overlapping portion of the subsections may include choosing a first representative point on a central line corresponding to each characteristic line in a first subsection having a non-conforming model of the characteristic line in at least a second subsection that overlaps the first subsection, and choosing a second representative point on a central line corresponding to the characteristic line in the second subsection. The first representative point and the second representative point are joined by a spline segment. At least a cross-section of the spline segment is then determined to represent at least an interpolated cross-section of the characteristic line.

Defining the background of the subsections may include constructing a background grid in each image subsection, which includes fixing a resolution of the background grid and identifying points within the background grid. The points may be identified by performing a signal expansion algorithm. Approximating polynomials representative of each point are constructed in the subsection background grid based on a predetermined degree for the polynomials. Background patches of each image subsection are identified, which includes identifying closed characteristic lines that enclose an area less than or equal a predetermined size, identifying short characteristic lines that have a length less than or equal to a predetermined distance, and identifying fine scale patches. Identifying fine scale patches includes convoluting the image through a Gaussian filter, identifying at least one of a local maximum value and a local minimum value, and approximating a fine scale patch shape around the local maximum value and/or local minimum value. Background textures of each image subsection may also be identified by marking pixels located within the identified background patches in the image subsection, constructing polynomials based on a least square approximation of a brightness value of pixels that have not been marked, filtering out selected patches based on a predetermined size limit and a difference between a brightness of the patches and a brightness of the slow-scale background at each of the points within the patches, aggregating patches not filtered out with the constructed polynomials, determining a difference between a brightness of the aggregated patches and a brightness of the image to form a residual background, and representing the residual background by a wavelets system.

The filtering of overlapping portions of the subsections may include deleting grid points of the overlapping portions of each subsection, maintaining the following conditions: a distance between any two points of the grid is at least R/2, where R is the resolution of the grid; every grid point is closer than R to at least one other grid point; and every grid point belongs to a boundary of the background or is farther than R/2 from the boundary of the background. All redundant representations of the background patches of each image subsection and all redundant representations of the background textures of each image subsection are deleted.

Yet another aspect of the present invention provides a method for creating a composite image by superimposing representations of corresponding multiple images of a common scene from a common perspective. The method includes representing a first image of the multiple images, which includes identifying multiple characteristic lines, identifying visual relationships among the characteristic lines (e.g., proximities and crossings) and defining background elements (e.g., slow-scale backgrounds and background patches) of the first image. Each of the characteristic lines, the visual relationships and the background elements includes at least a geometric parameter and a brightness parameter. Brightness parameters of each of the remaining images of the multiple images are then sequentially determined by isolating the geometric parameters of the characteristic lines, the visual relationships and the background elements of the first image, and deriving for each remaining image corresponding brightness parameters for the characteristic lines, the visual relationships and the background elements corresponding to the isolated geometric parameters from the first image.

The multiple images may originate from corresponding different image sources. The multiple images may respectively include a red color separation, a green color separation and a blue color separation. Alternatively, the first image of the multiple images may include a luma color separation.

Another aspect of the present invention provides a computing apparatus for implementing representation of a digital image. The computing apparatus includes a computing device for executing computer readable code, an input device for receiving the digital image and interfacing with a user, at least one data storage device for storing computer data, and a programming code reading device that reads computer executable code. The computing device is in communication with the input device, the data storage device and the programming code reading device. The computer executable code causes the computing device to identify multiple characteristic lines of the digital image, identify visual relationships among the plurality of characteristic lines, including proximities and crossings, and define a background of the image, including slow-scale background and background patches. The computer executable code further stores data representing at least one of the multiple characteristic lines, the visual relationships and the background in the at least one data storage device.

The computer executable code may further cause the computing device to assemble mathematical models representing the multiple characteristic lines, the visual relationships and the background, respectively. The mathematical models representing the characteristic lines are then aggregated with the mathematical models representing the visual relationships among the characteristic lines and the background of the image. The computer executable code may store data representing the mathematical models representing the characteristic lines, the visual relationships and the background in the at least one data storage device.

In another aspect of the present invention, the computer executable code causes the computing device to identify multiple characteristic lines of the image and to identify proximities between at least two of the characteristic lines based on a chain of coupled spline segments, which are derived from boundary lines corresponding to each of the at least two characteristic lines and are less than a predetermined length. The computer executable code further causes the computing device to identify crossings between at least two of the characteristic lines. The crossings include elementary crossings based on at least geometric adjacencies among endpoints and spline segments of multiple edges and ridges, first order crossings based on at least a detection of intersecting characteristic lines among the multiple characteristic lines, second order crossings based on at least a detection of identified first order crossings within a predetermined distance of one another, and proximity crossings based on proximities that are less than a predetermined distance in length. A slow-scale background of the digital image is identified based on a signal expansion algorithm to identify multiple points within a background grid and multiple approximating polynomials representative of each of the points within the background grid. Background patches of the digital image are identified based on identification of at least one of closed characteristic lines enclosing an area less than a predetermined size and short characteristic lines having a length less than a predetermined distance. The computing device further determines mathematical models corresponding to the characteristic lines, the proximities, the crossings, the slow-scale background and the background patches, and aggregates the mathematical models to represent the image. The computer executable code stores data representing at least one of the multiple characteristic lines, the proximities, the crossings, the slow-scale background, the background patches and the mathematical models in the at least one data storage device.

In another aspect of the present invention, the computer executable code causes the computing device to define textures. Defining textures includes marking pixels located within the identified patches, constructing polynomials based on a least square approximation of brightness values corresponding to pixels that have not been marked and filtering out selected patches based on size and brightness parameters. The patches not filtered out are aggregated with the constructed polynomials. A difference between a brightness of the aggregated patches and a brightness of the digital image is determined to form a residual background, which is represented via a wavelets system.

In yet another aspect of the present invention, the computer executable code causes the computing device to cover the image with overlapping subsections, each of which has a predetermined size and shape, wherein the size is greater than or equal to a locality size. Each subsection is processed independently, such that the processing includes identifying a multiple characteristic lines in the subsection, identifying visual relationships among the characteristic lines, assembling mathematical models representing the characteristic lines and the visual relationships, and aggregating the mathematical models representing the characteristic lines with the mathematical models representing the visual relationships. For each of the characteristic lines in each overlapping portion of the subsections, interpolation is performed among any non-conforming models that exist for the same characteristic line in the overlapping portion. A background of the subsections is defined, including slow-scale background and background patches, and overlapping portions of the subsections are filtered. The computer executable code also stores data representing at least one of the characteristic lines, the visual relationships among the characteristic lines and the background of the digital image in the at least one data storage device.

Another aspect of the present invention provides a computing apparatus for implementing representation of a composite image from multiple images. The computing apparatus includes a computing device for executing computer readable code, an input device for receiving multiple digital images of a common scene from a common perspective and interfacing with a user, at least one data storage device for storing computer data, and a programming code reading device that reads computer executable code. The computing device is in communication with the input device, the data storage device and the programming code reading device. The computer executable code causes the computing device to represent a first image of the multiple images, which includes identifying multiple characteristic lines, identifying visual relationships among the characteristic lines (e.g., proximities and crossings) and defining background elements (e.g., slow-scale backgrounds and background patches) of the first image. Each of the characteristic lines, the visual relationships and the background elements includes at least a geometric parameter and a brightness parameter. Brightness parameters of each of the remaining images of the multiple images are then sequentially determined by isolating the geometric parameters of the characteristic lines, the visual relationships and the background elements of the first image, and deriving for each remaining image corresponding brightness parameters for the characteristic lines, the visual relationships and the background elements corresponding to the isolated geometric parameters from the first image. The computer executable code further causes data representing at least one of the multiple characteristic lines, the visual relationships among the characteristic lines and the background elements of each of the multiple digital images to be stored in the at least one data storage device.

BRIEF DESCRIPTION OF THE DRAWINGS

The present invention is further described in the detailed description that follows, by reference to the noted plurality of drawings by way of non-limiting examples of preferred embodiments of the present invention, in which like reference numerals represent similar parts throughout several views of the drawings, and in which:

FIG. 12 shows exemplary types of elementary crossings and the image patterns corresponding to the exemplary types of elementary crossings, according to an aspect of the present invention;

FIG. 23 shows exemplary types of other image patterns identified as patches, according to an aspect of the present invention;

FIG. 33 shows exemplary edge and ridge cross-sections for a "normal" scanner tuning and an "over-sharp" tuning, respectively, according to an aspect of the present invention.

DETAILED DESCRIPTION OF EMBODIMENTS

Figure 1:
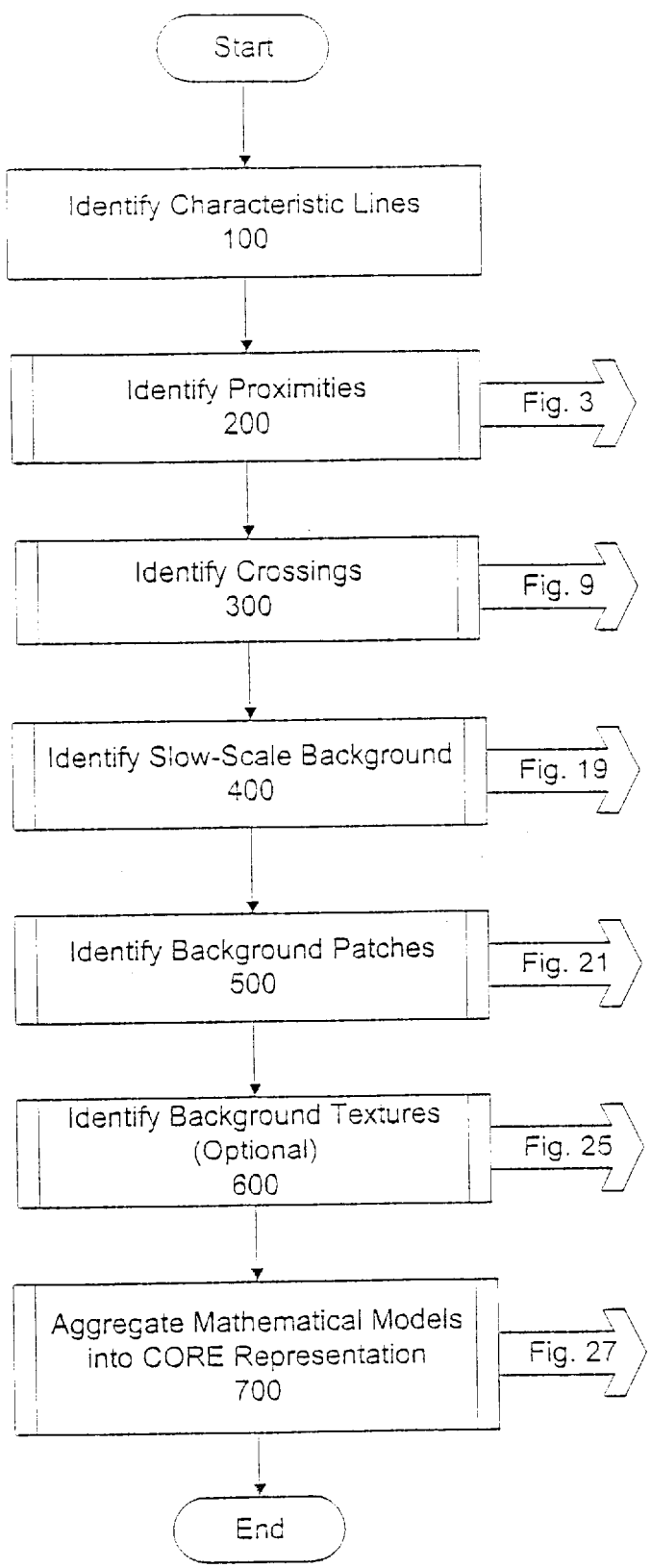
FIG. 1 is a flow chart illustrating the Content-Oriented Representation process, according to an aspect of the present invention.

The present invention is a method and apparatus for representing digital images as mathematical models. In particular, the invention relates to using the identified characteristic lines and associated parameters of an image, including characteristic strips, signatures, cross-sections and transformations, as the basis for determining the content-oriented representation ("CORE") parameters, which transform the image into a globalized mathematical model. The CORE process includes identifying proximities and crossings of characteristic lines; identifying the background, including the slow-scale background, patches and textures; and aggregating the mathematical models derived from the image. A CORE represented image is accurately and efficiently reproducible based on these mathematical models.

Different types of images are processed according to the present invention, originating from different sources. Types of images include, for example, black and white and color images produced by digital photography and video (or digitally scanned into a computer); sensor data, such as laser depth, infrared, ultrasound and x-ray images, and temperature maps; and synthetic images, generated by computer or similar means, such as computer tomography (CT) scan imaging, magnetic resonance imaging (MRI), molecular computations and scientific visualization. Many other image sources exist and new sources appear in various applications. Although a significant type of image is the digital image, in which the image data are represented in digital form, the present invention encompasses all types of image data, including analog image data.

Characteristic Lines

The basic image element utilized in the present invention is a "characteristic line," together with numerous parameters inherently associated with each characteristic line. Details regarding the definition and identification of characteristic lines and associated parameters of digital images are set forth in U.S. patent application Ser. No. 09/716,279, filed on Nov. 21, 2000, entitled "Method and Apparatus for Image Analysis and Processing by Identification of Characteristic Lines and Corresponding Parameters," the disclosure of which is expressly incorporated herein by reference in its entirety. As shown at step 100 of FIG. 1, identifying the characteristic lines and associated parameters of an image is the first step of the CORE process.

Generally speaking, a characteristic line is a line on the original image along which the brightness (or color) pattern of the image qualitatively repeats itself. Usually, the image patterns along these lines are visually distinguishable from neighboring portions of the image (e.g., the background). The most typical type of characteristic line is the conventional edge, which is a line separating image regions having distinct or sharply contrasting brightnesses and/or colors. With each characteristic line is an associated "characteristic strip." A characteristic strip is the part of the image covered by visually discernible patterns that repeat themselves along the associated characteristic line.

Each characteristic line also has a "central line." This is the line that is visually perceived as geometrically representative of the characteristic line. Central lines are incorporated into nearly all aspects of processing the characteristic lines. The central line faithfully represents the shape of the characteristic line, and is relatively smooth and geometrically simple.

Another aspect of each characteristic line is the "transition area." This is the portion of the image representing the transition between the line patterns and the background. This transition area is also referred to as the "margin" of the characteristic line. Ordinarily, the margin is visually perceived as a thin band around the exterior boundary of the characteristic strip.

Each characteristic line also has a corresponding "signature." A signature is the local brightness (or color) pattern that repeats itself along the characteristic line. The signature generally describes the simplest repeating pattern present. The parameters of the signature are the brightness and geometric parameters of the repeating pattern that vary significantly along the line. Generally, the minimal set of these brightness and geometric parameters is used. Closely related to the signature is the "cross-section" of the characteristic line. A cross-section is the brightness (or color) pattern in a direction orthogonal to the line. A cross-section is represented by the coordinates (d, b), in which d is the distance from the central line and b is the brightness. In alternative embodiments, b represents, instead of brightness, the intensity of each color separation, the intensity of any sensor measurement or a vector value. For example, b may represent the intensities of the three standard color separations, red, green and blue (R,G,B), or other color separations, such as hue, saturation and value (H,S,V).

The patterns along the characteristic line are not assumed to repeat themselves precisely. These patterns need only be visually perceived as repetitions, with possible variations in brightness and geometry, of the same pattern. Therefore, a "fitting transformation" must be performed, including both brightness and geometric components, in which the signature is fit to one of the perceived repetitions along the characteristic line. A sequence of fitting transformations of the signature representing repetitions along a characteristic line is known as a "fitting sequence."

One common type of characteristic line is the "uniform characteristic line," which is a characteristic line having a signature that is completely characterized by a single cross-section brightness (or color) pattern. For uniform characteristic lines, the image pattern along the line is not only periodic, but essentially constant (within tolerance for the fitting transformations). The cross-section of a uniform characteristic line is a one-dimensional brightness (or color) pattern, in a direction orthogonal to the line, which substantially completely characterizes its signature. For uniform characteristic lines, the fitting transformation is simply a transformation of the cross-section at one point of the line to the cross-section at another point on the line. Therefore, the notion of the fitting sequence is replaced by a "fitting path." This is a one-parametric family of fitting transformations of the cross-section at one point of the line to the cross-sections at all other points along the line.

Another type of characteristic line is the "non-uniform characteristic line." A non-uniform characteristic line has a signature that is spatially localized on the line. Although the signature of a non-uniform characteristic line may consistently repeat itself along the line, it usually cannot be characterized by a cross-section evolving along the line, as in the case of a uniform characteristic line. Generally, a non-uniform characteristic line can be appropriately represented as a combination of multiple uniform characteristic lines and associated parameters.

Once the characteristic lines and associated parameters have been identified and mathematically modeled, the visually significant relationships among the characteristic lines must be identified, as shown at step 200 of FIG. 1. In an embodiment of the invention, there are two types of visually significant relationships, "proximities" and "crossings," which are identified at steps 200 and 300, respectively.

Proximities

A proximity is an area between two or more characteristic lines that pass within a predetermined distance from one another, without actually intersecting. The procedure for identifying proximities is similar to the detection of adjacencies, as described in the application entitled "Method and Apparatus for Image Analysis and Processing by Identification of Characteristic Lines and Corresponding Parameters" U.S. patent application Ser. No. 09/716,279, filed on Nov. 21, 2000, with respect to characteristic lines. The difference is that the procedure for identifying proximities is applied to the boundaries of characteristic lines, instead of the edges and ridges. Proximities represent the geometric separation of different image elements, which are visually perceived as aggregated with one another, but derive from separate image patterns. In contrast, adjacencies represent the geometric separation between the various image elements, which are visually perceived as part of the same image pattern.

Figure 2B:
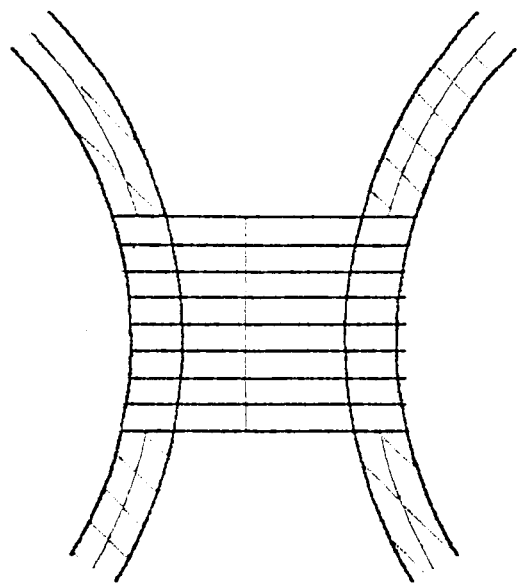
FIG. 2 shows an exemplary proximity between two characteristic lines in comparison to an exemplary adjacency within a characteristic line, according to an aspect of the present invention.
Figure 2A:
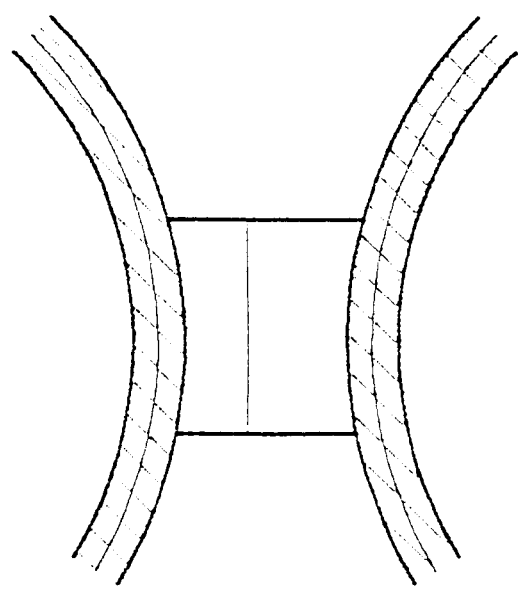

Depending on the image interpretation, some patterns may be interpreted as either adjacencies or proximities, as shown in FIG. 2. FIG. 2(*a*) shows a relationship between image elements as a proximity between two separately identified characteristic lines, where the upper and lower hatched areas represent the separate characteristic lines. FIG. 2(*b*) show the same visual relationship, but the elements have been joined as an adjacency between two outer edges within a single characteristic line, represented by the vertical lines. In other words, as shown by the comparison of FIGS. 2(*a*) and 2(*b*), proximities are visual relationships between different characteristic lines, while adjacencies are visual relationships between different elements of the same characteristic line.

Both types of visual relations depend on the visual angular distances between the elements. One embodiment of the present invention incorporates angle and distance criteria for identifying both proximities and adjacencies. Interpretation of these characteristic line relationships as proximities or adjacencies depends on image resolution and complexity, viewing conditions and processing requirements. For example, in the case of a 500×700 pixel RGB image of a dense, natural world scene, viewed from a distance of about 15 inches on a 17 inch, 75-dpi resolution monitor screen, typical ranges for proximity and adjacency separations are 6 to 20 pixels and 2 to 8 pixels, respectively. Aggregating elements of such an image (as either proximities or adjacencies) separated by more than 20 to 24 pixels would likely not provide any practical advantage.

Figure 3:
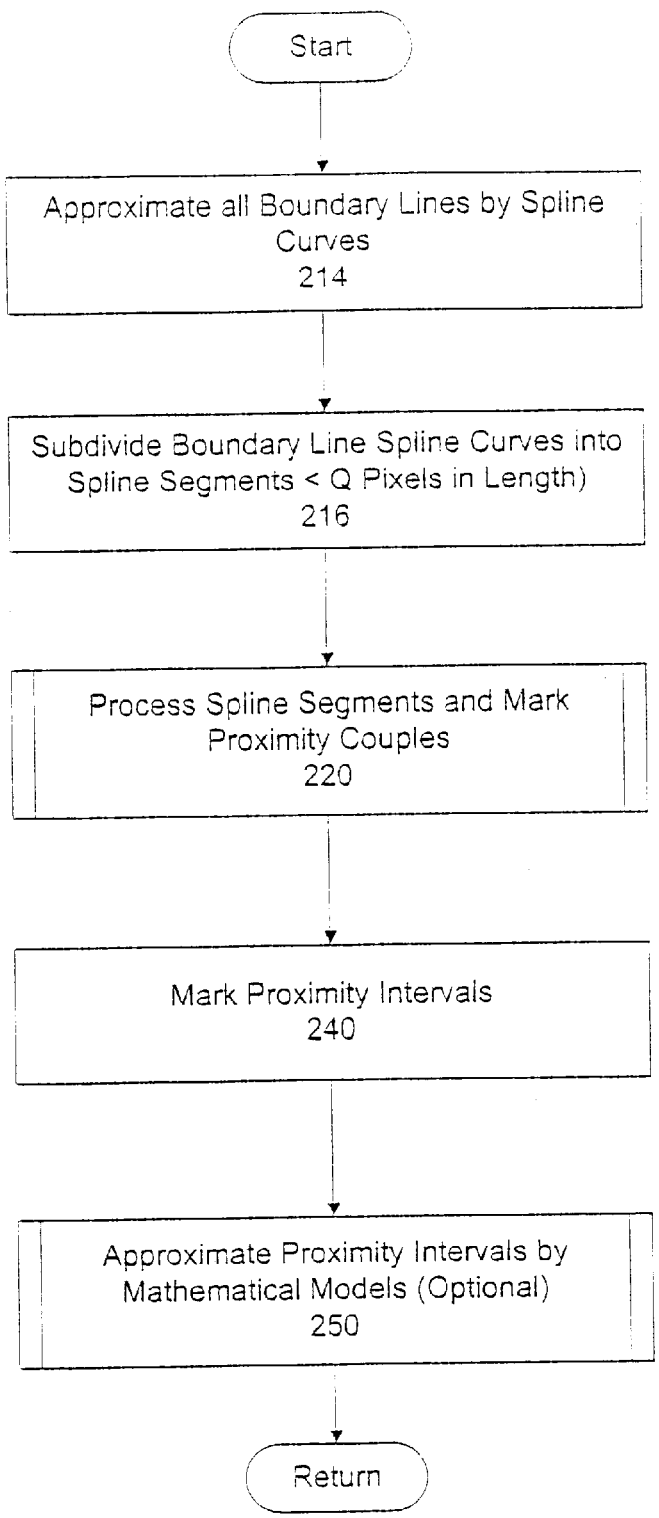
FIG. 3 is a flow chart illustrating the overall identification of proximities process, according to an aspect of the present invention.
Figure 4:
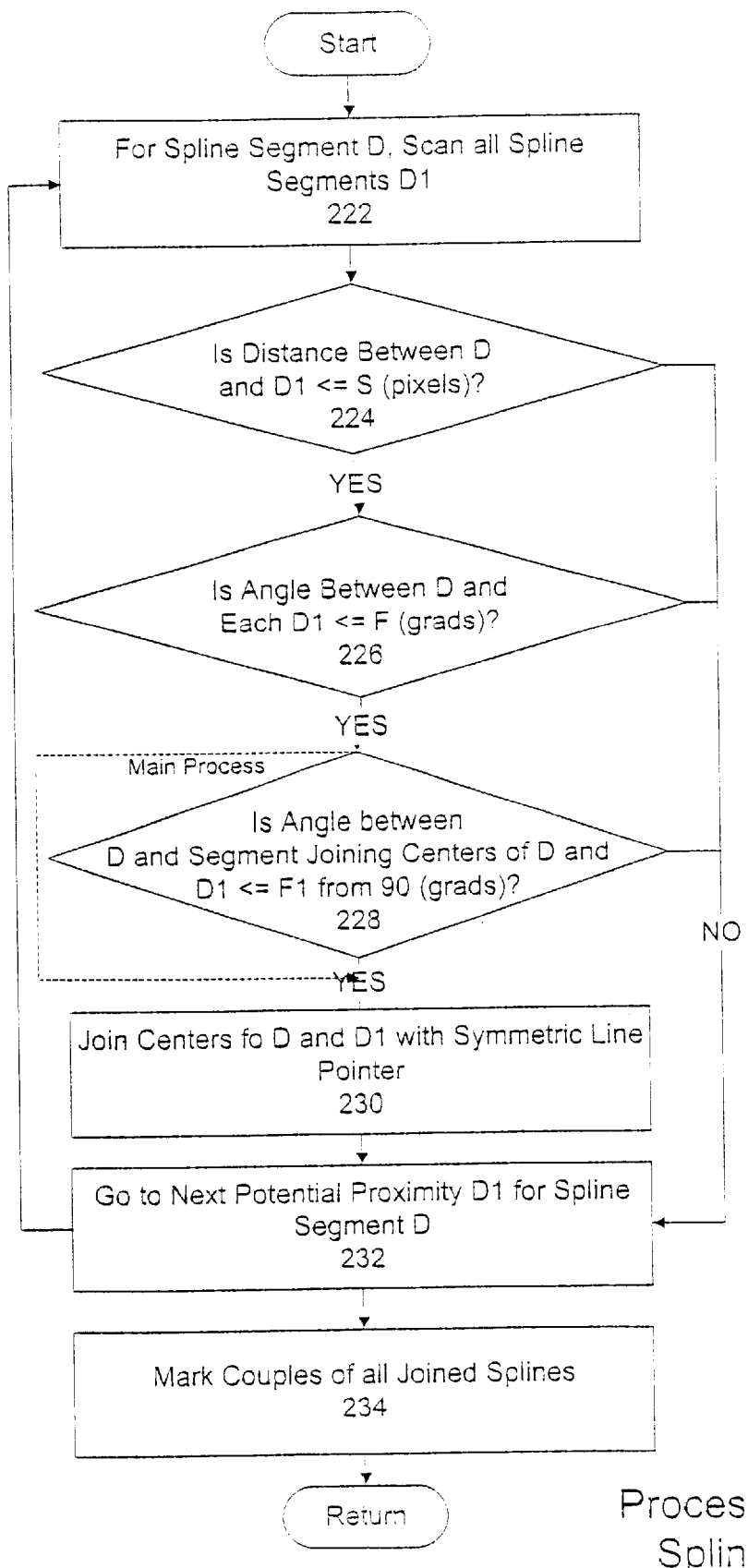
FIG. 4 is a flow chart illustrating the steps for processing proximity spline segments within the identification of proximities process, according to an aspect of the present invention.
Figure 5:
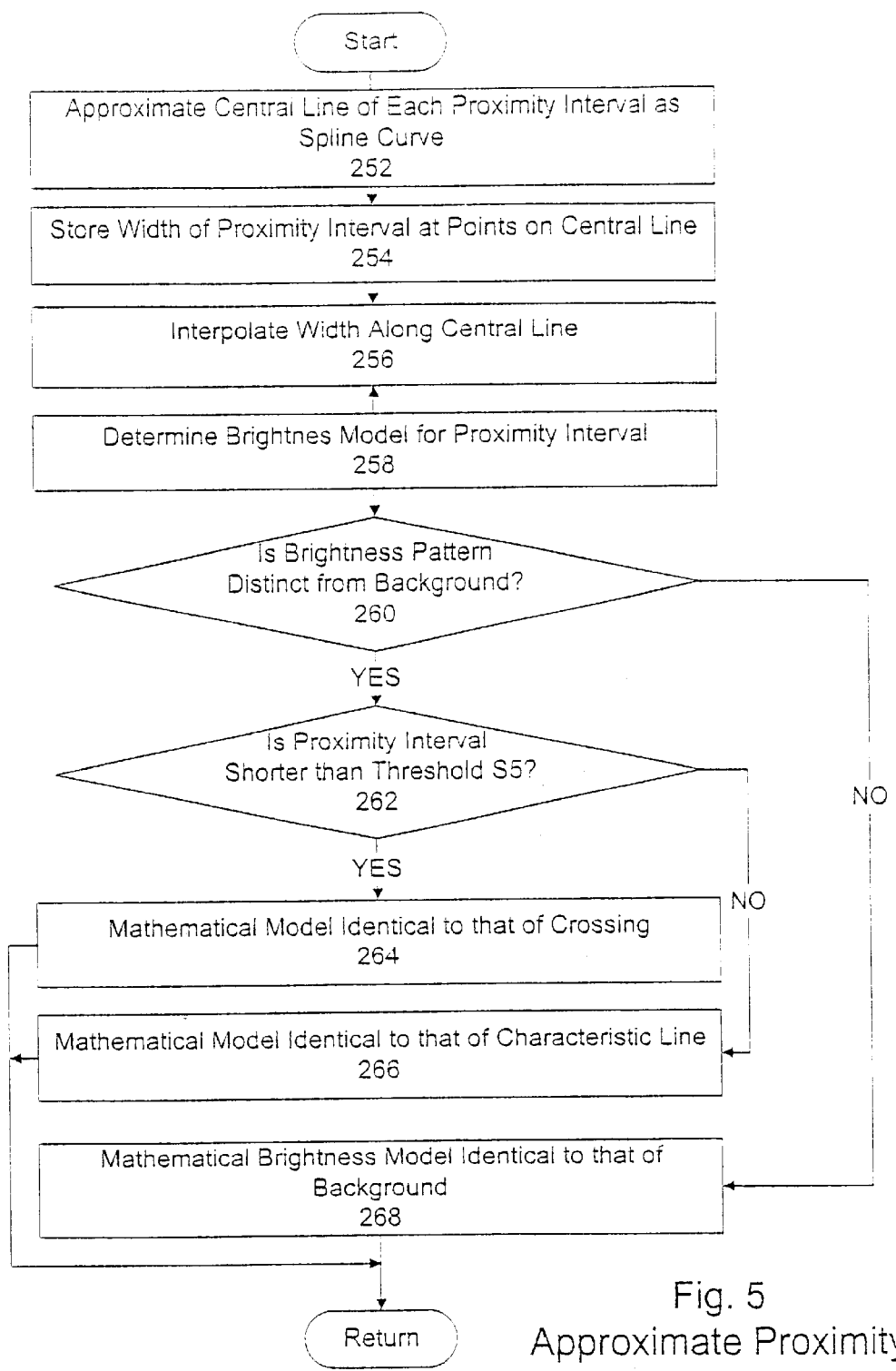
FIG. 5 is a flow chart illustrating the steps for representing proximity intervals by mathematical models steps within the identification of proximities process, according to an aspect of the present invention.

Proximities can be identified either automatically or manually (i.e., interactively). The steps in the identification process (FIG. 1, step 200) are the same, regardless of whether the identification is automatic or manual, as shown in the flowcharts of FIGS. 3–5. First, the boundary lines of the previously identified characteristic lines are approximated by spline curves at step 214. The spline curves are of the second or third order, although any order of spline curve may be incorporated. Identification of boundary lines is accomplished by the method of the patent application entitled "Method and Apparatus for Image Analysis and Processing by Identification of Characteristic Lines and Corresponding Parameters," U.S. patent application Ser. No. 09/716,279, filed on Nov. 21, 2000. In the alternative, the boundary lines may be identified using any conventional vector graphics tool, such as "Photoshop," developed by Adobe Systems Incorporated, and "Flash," developed by Macromedia, Inc.

At step 216, the boundary line spline curves are divided into a series of spline segments, each having a length of approximately three pixels, or less. The spline segments are processed in their natural progression along the respective spline curves at step 220. In an embodiment of the invention, processing of the spline segments, as set forth in step 220 of FIG. 3, is depicted in the flowchart of FIG. 4. For each spline segment D, all other spline segments D1 are scanned at step 222 to determine all potential proximity relationships for the spline segment D. As stated above, whether a proximity exists depends on the distance and angle between any two spline segments. Therefore, at step 224, it is determined whether the distance between D and each spline segment D1 is less than a predetermined threshold distance of S pixels. In an embodiment of the invention, S is approximately 16 pixels, for example, although any distance between approximately 2 to 64 pixels may be used. If the distance between D and D1 exceeds the threshold, then the process proceeds to step 232 and subsequently analyzes the next set of spline segments D and D1 at step 222.

If the distance is within threshold S, then the angle between D and D1 is measured at step 226. If the angle is less than or equal to a predetermined threshold angle F, then D and D1 are joined at their centers by a symmetric line pointer at step 230. (Step 228 is included in an alternative embodiment of the invention, described below.) F is approximately 20 grads in an exemplary embodiment of the invention, although any angle between approximately 5 to 60 grads may be used. The symmetric line pointer must be directed outward from each of the characteristic strips corresponding to the two spline segments involved. The symmetric pointer indicates that D and D1 define a preliminary proximity relationship, referred to as a "couple." However, if the angle exceeds the threshold amount, then the process proceeds directly to step 232 and analyzes the next set of spline segments D and D1 at step 222, regardless of whether the distance was within tolerance S for proximity identification.

Figure 6:
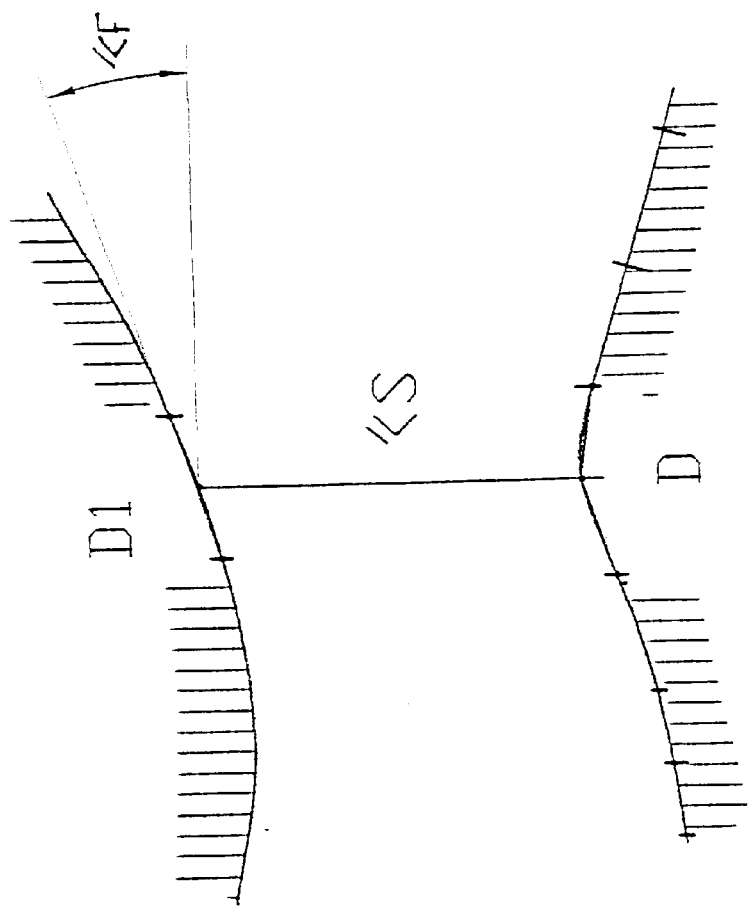
FIG. 6 shows a symmetric line segment point joining two exemplary characteristic strips, according to an aspect of the present invention.

FIG. 6 depicts the thresholds S and F between spline segments D and D1 joined as a couple between separate characteristic lines. The vertical line is a symmetric pointer joining the center point of D on the lower characteristic line and the center point of D1 on the upper characteristic line. The vertical line is less than or equal to S. Also, the angle between the direction of D1 and the direction of D is less than or equal to F.

In an alternative embodiment, D and D1 must also meet the additional criteria at step 228 that the angle between their respective directions and the symmetric pointer connecting their centers does not exceed a predetermined angle F1 from 90 degrees. In an exemplary embodiment, F1 is approximately 15 grads, although any angle between approximately 5 to 60 grads may be used. When the relationship between D and D1 are within the criteria of S, F and F1, then D and D1 are joined at their centers by a symmetric line pointer at step 230, forming a couple.

Figure 7:
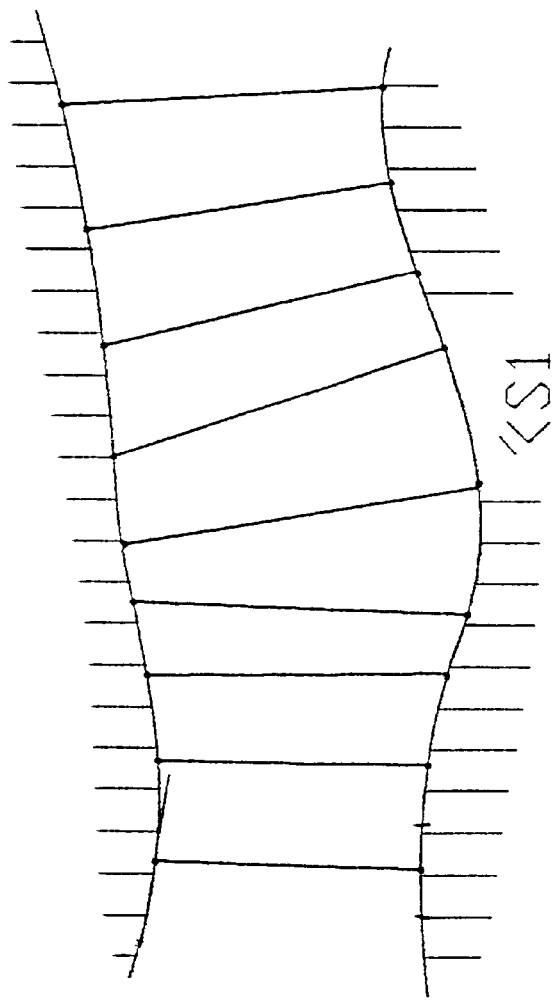
FIG. 7 shows couples of joined segments of an exemplary proximity interval, according to an aspect of the present invention.

As a result of processing the spline segments, the spline curves are represented by series of couples, consisting of spline segments joined by pointers, an example of which is shown in FIG. 7. These couples are marked at step 234 of FIG. 4. Usually, the couples occur in relatively long chains. An uninterrupted chain of couples is referred to as a "proximity interval."

Referring to FIG. 3, the proximity intervals formed by the couples from FIG. 4 are marked at step 240. The proximity intervals are identified by marking the end points of the continuous chains of joint segments. Gaps in these chains shorter than a predetermined threshold value S1 are ignored, as shown in FIG. 7. The threshold value S1 may be 0.5 to 16 pixels, for example.

Figure 8:
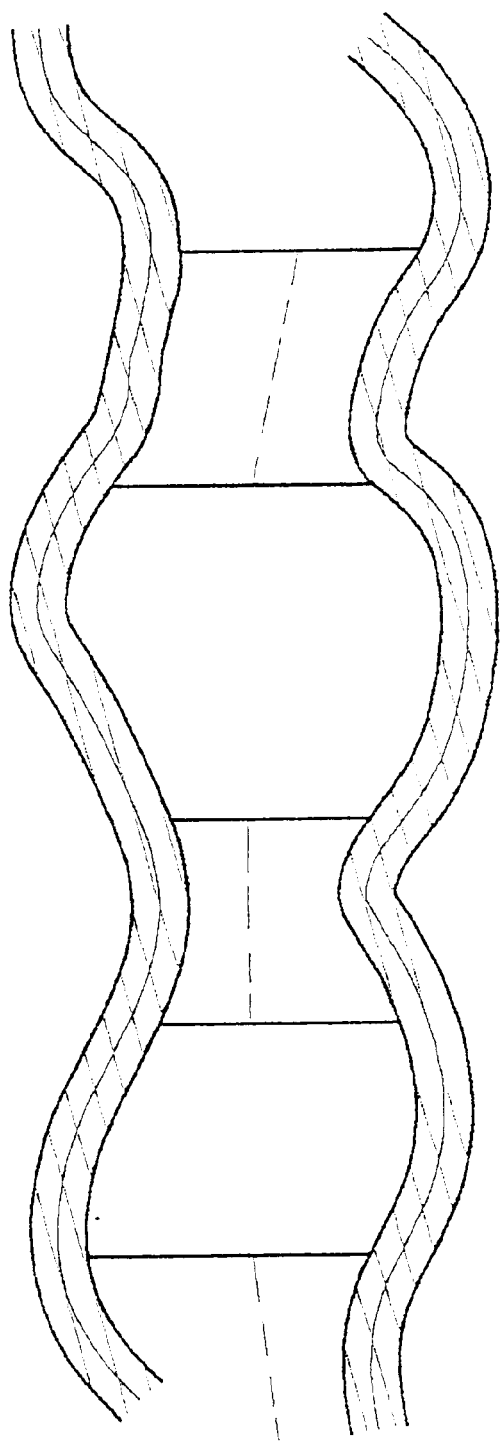
FIG. 8 shows an exemplary proximity between characteristic lines, according to an aspect of the present invention.

FIG. 8 depicts the result of identifying proximities and marking proximity intervals. The proximity of two characteristic lines, for example, is captured as a number of their proximity intervals. Each proximity interval is represented by two intervals on the boundary lines of the characteristic lines, with the endpoints of these proximity intervals joined by the "proximity pointers." The solid, vertical lines of FIG. 8 represent the proximity pointers associated with the endpoints of the proximity intervals. The generally horizontal dashed lines represent center lines of the characteristic lines that represent each proximity interval, described below.

Once formed at step 240 of FIG. 3, the proximity intervals may be approximated by mathematical models by the process at step 250. (In some applications, it may be advantageous skip step 250, thus identifying the proximity intervals without representation by mathematical models.) Each proximity interval is represented geometrically as a special type of a characteristic line having a center line. The center line is formed by the respective centers of the symmetric pointers of the couples, forming the proximity interval.

Then, the center line of each proximity interval characteristic line is approximated by a spline curve, as indicated at step 252 of FIG. 5. The central lines of the proximity intervals in FIG. 8 are indicated by the horizontal dashed lines. The width of each proximity interval is stored at various points on the central line of the proximity interval characteristic line at step 254, enabling interpolation of the proximity interval width along the entire central line at step 256. This results in mathematical representation of the basic geometric dimensions of the corresponding proximity interval.

A brightness model for each proximity interval is subsequently determined at step 258. Usually, the brightness pattern of a proximity interval is visually perceived as a part of the image background. In other words, the proximity interval visually appears as a background space between characteristic lines. Whether a proximity interval is visually distinct from the background, with respect to brightness, is determined at step 260. The brightness at the interior points of the proximity interval is compared with the background brightness outside the proximity interval. If the difference in brightness exceeds a threshold $\beta$, a separate brightness model is used to represent the proximity interval. If the difference is less than the threshold $\beta$, the proximity area is simply included in the mathematical model for the background with respect to brightness, i.e., no separate brightness model is constructed for the proximity interval, as indicated at step 268.

If the brightness pattern of the proximity interval differs visually from the background at step 260, the length of the proximity interval is determined at step 262. If the visually distinct proximity interval is shorter than a predetermined threshold length S5, usually about 4 to 32 pixels, then the proximity interval is represented mathematically as a "crossing" at step 264. (Mathematical models for crossings are discussed in detail, below.) Otherwise, the process proceeds to step 266, at which the proximity interval is represented by a mathematical model identical to that of the characteristic line by which it was originally represented. In other words, the proximity interval consists of the central line (approximated at step 252), along with the corresponding signature and fitting sequence or fitting path.

Crossings

After identification of proximities, the method proceeds to step 300 of FIG. 1 for identification of "crossings." A crossing of two or more characteristic lines is an image area that is visually perceived as common to all of the characteristic lines. In other words, a crossing is where two or more characteristics lines appear to intersect. (In contrast, a proximity is an image area in which characteristic lines are visually perceived as aggregated, but not intersecting.) In an embodiment of the invention, there are four distinct types of crossings captured in the CORE process. There are "elementary crossings," "first order crossings," "second order crossings" and proximities identified as crossings. The types of crossings are processed in order, as shown in steps 310, 340, 350 and 360 of FIG. 9.

Elementary crossings are generally defined as crossings involving edges or ridges. Elementary crossing are detected at the first stage of the algorithm for an automatic identification of characteristic lines, described in patent application "Method and Apparatus for Image Analysis and Processing by Identification of Characteristic Lines and Corresponding Parameters," U.S. patent application Ser. No. 09/716,279, filed on Nov. 21, 2000. The elementary crossings are identified in the process at step 310 on the basis of the geometric adjacencies between the end points of the edges and ridges.

Figure 10:
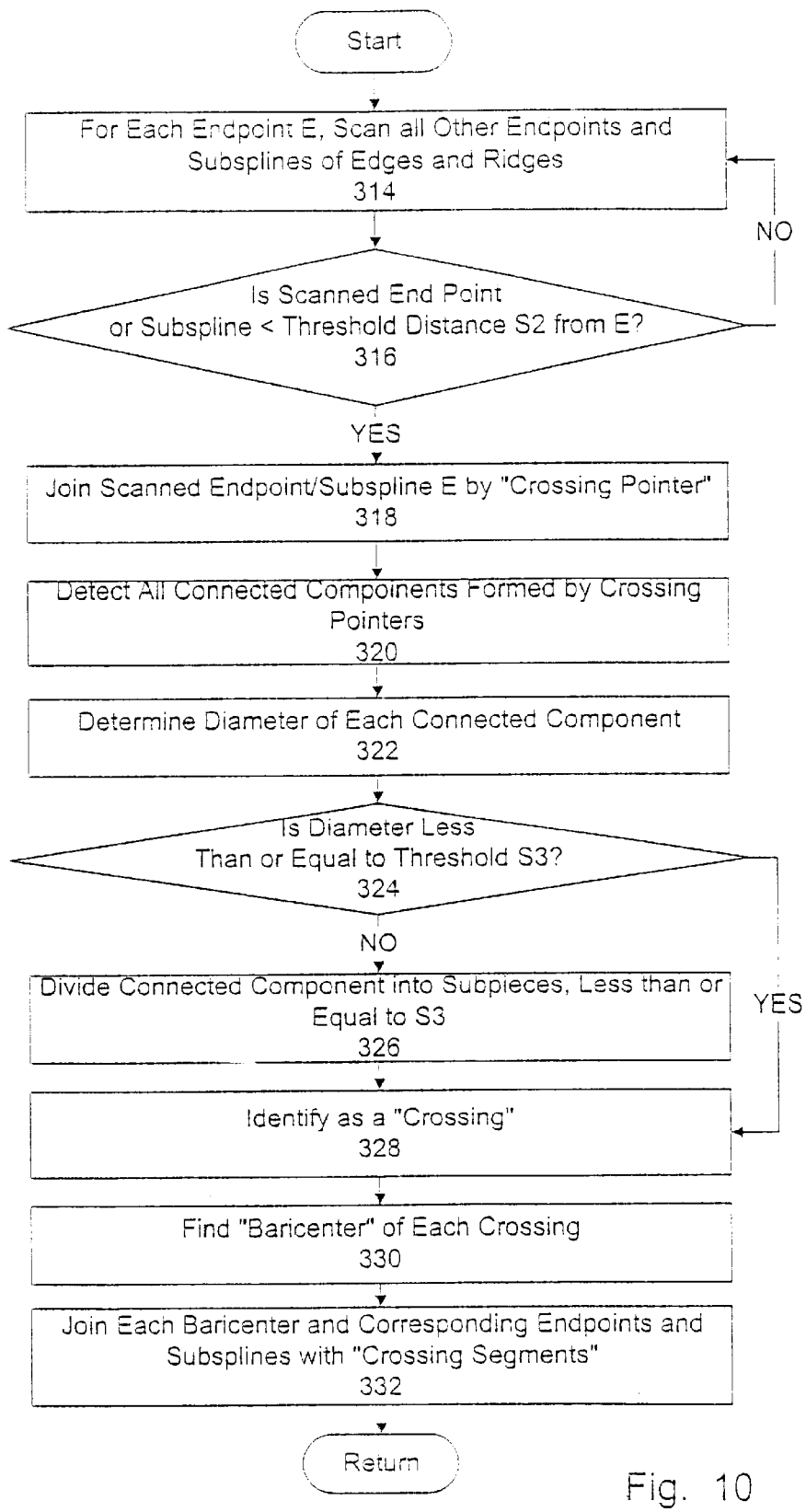
FIG. 10 is a flow chart illustrating the steps for identifying elementary crossings within the identification of crossings process, according to an aspect of the present invention.

The process of identifying elementary crossings is shown in the flowchart of FIG. 10. For each endpoint of the detected edges and ridges, all of the other endpoints, as well as all spline sub-pieces of edges and ridges (constructed in the automatic detection algorithm) are scanned at step 314. The endpoints of the edges and ridges may be initially ordered in a list and processed in that order for efficiency in processing. All endpoints and spline sub-pieces (segments) that are closer to the original endpoint than a certain threshold S2, as determined at step 316, are joined by a segment with that original endpoint at step 318. In an exemplary embodiment of the invention, the threshold S2 is approximately 3 pixels, although values of S2 between 0.5 and 8 pixels may be used. The joining segments are referred to as "crossing pointers" and the sets of joined endpoints and/or subsplines are referred to as "connected components."

At step 320, all the connected components formed by the crossing pointers are detected. Because each of the connected components represent crossings, they must be fit into a scale (S3) for proper processing. S3 represents the largest diameter of a crossing identifiable in an aspect of the invention and, in an exemplary embodiment of the invention, S3 is approximately 5 pixels, but could be between 1 and 16 pixels. Therefore, the diameter of each connected component is detected at step 322. At step 324, it is determined whether the detected diameter of the connected component is less than S3. The connected components with diameters larger than S3 are subdivided into sub-pieces having diameters less or equal to S3 at step 326. All of the connected components can then be properly identified as crossings at step 328.

Figure 11:
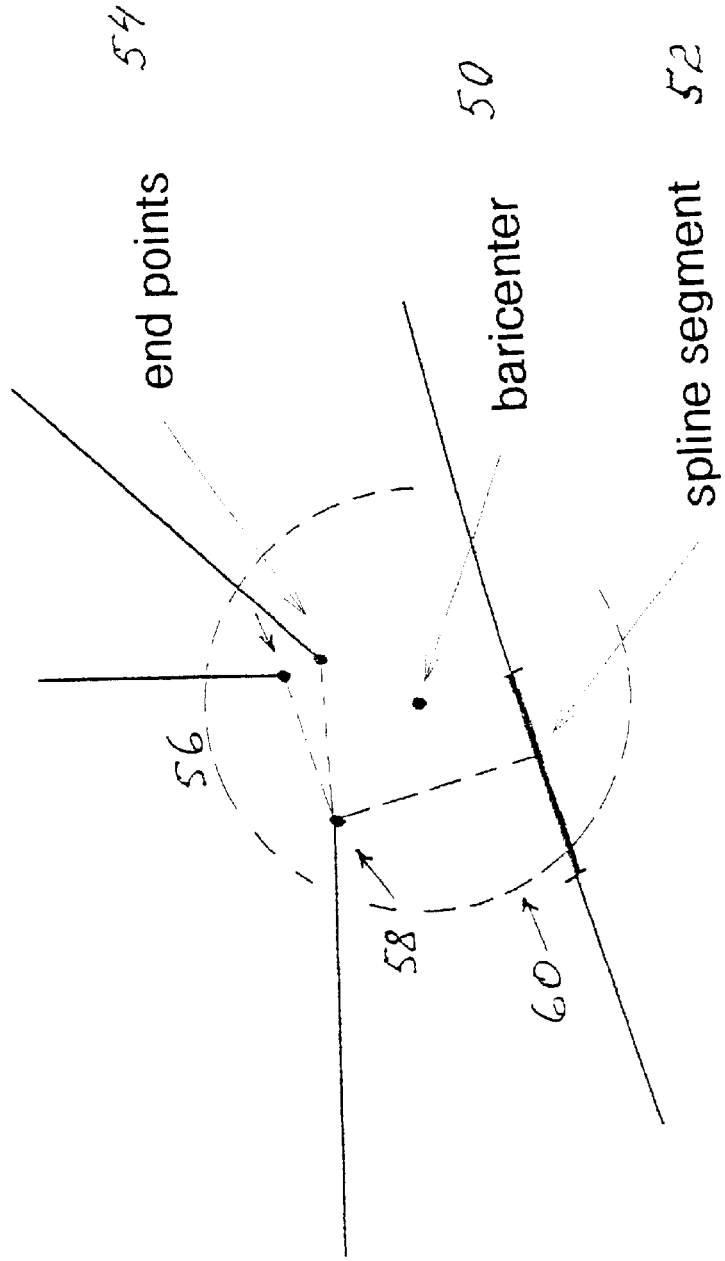
FIG. 11 shows the structure of an exemplary elementary crossing, according to an aspect of the present invention.

At step 330, the "baricenter" is identified for each crossing. The baricenter is the point at which the multiple characteristic lines are perceived to intersect. The baricenter of each crossing is joined at step 332 by "crossing segments" with the original endpoints and/or subsplines that correspond to the connected components of the crossing. FIG. 11 shows an exemplary elementary crossing with a baricenter 50, endpoints 54, 56 and 58, and a spline segment 52, all joined by crossing segments indicated by dashed lines. FIG. 11 is considered a single connected component of the image in that the diameter 60 is less than or equal to S3.

FIG. 12 shows three exemplary types of image patterns (upper images) that are captured as elementary crossings (corresponding lower images). In FIG. 12(a), the image pattern of two edges is represented as a couple, joining an endpoint of one edge with a spline segment of the second edge. FIG. 12(b) shows three endpoints that are within a distance S2 of one another and are therefore visually perceived as a crossing with the associated image pattern, above. FIG. 12(c) shows an elementary crossing of the endpoint of a vertical ridge and a generally horizontal edge.

Figure 9:
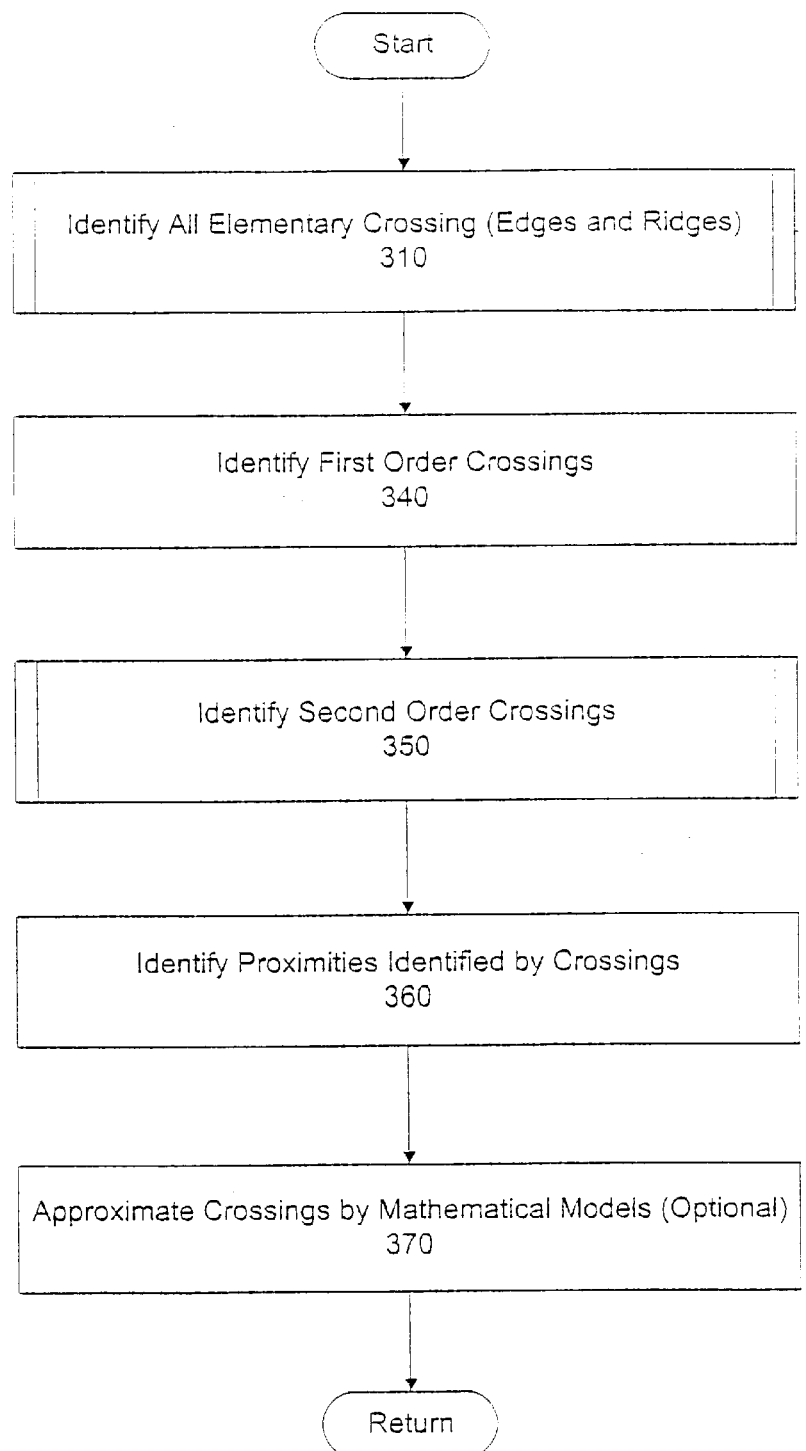
FIG. 9 is a flow chart illustrating the overall identification of crossings process, according to an aspect of the present invention.

On the next level, the first order crossings identified at step 340 of FIG. 9. First order crossings are those crossings produced directly from the automatic identification of characteristic lines algorithm, described in patent application "Method and Apparatus for Image Analysis and Processing by Identification of Characteristic Lines and Corresponding Parameters," U.S. patent application Ser. No. 09/716,279, filed on Nov. 21, 2000. Automatic detection of characteristic lines marks the ends of common adjacency intervals of the originally detected edges (and ridges). At each endpoint of this form, the cross-section of the uniform characteristic line changes its type. Each end-point is therefore classified as a first order crossing. Note that some of the first order crossings may be identified also as elementary crossings.

Figure 13C:
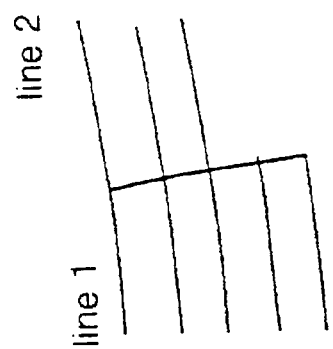
FIG. 13 shows exemplary types of first order crossings, according to an aspect of the present invention.
Figure 13B:
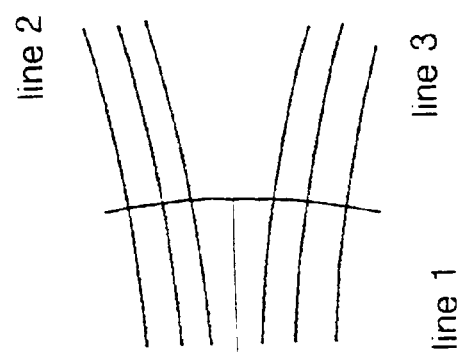
Figure 13A:
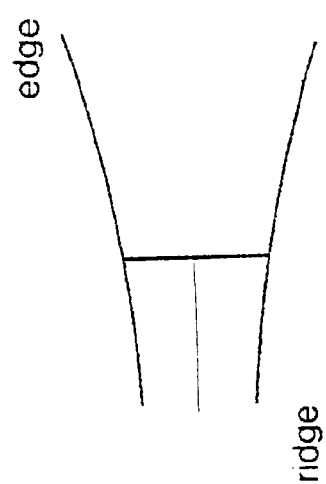

FIG. 13 shows exemplary first order crossings. FIG. 13(a) depicts a ridge that extends into two separate edges. The point at which the image pattern changes from a ridge to two edges (e.g., the point at which the separation between parallel lines exceeds the ridge model threshold), is captured as a first order crossing. FIG. 13(b) shows a single characteristic line composed of multiple, parallel edges, diverging into two separate characteristic lines. The point of divergence is captured as a first order crossing. FIG. 13(c) shows the end area of one characteristic line connecting with the end area of a second, narrower characteristic line. The area of intersection is likewise captured as a first order crossing.

Figure 14:
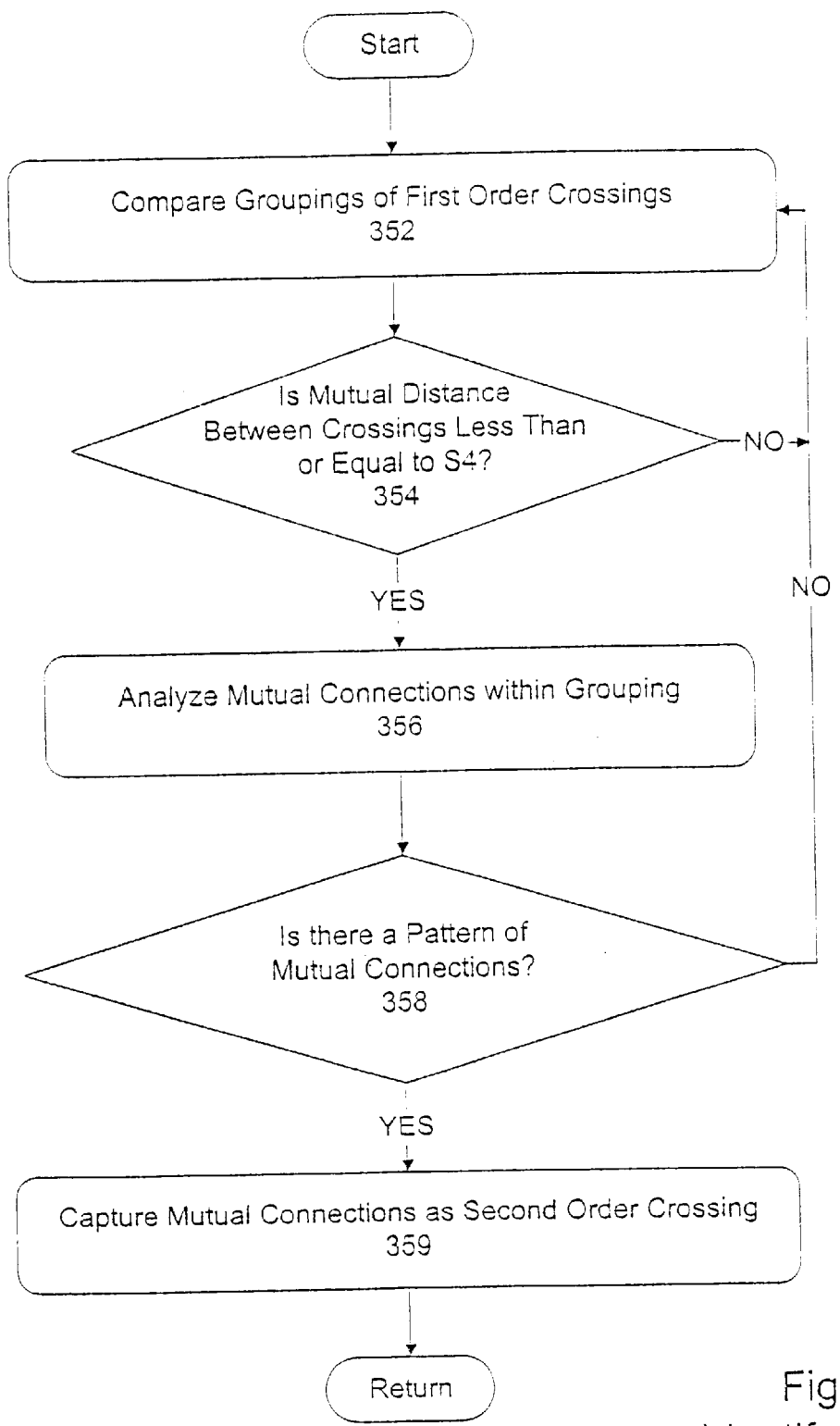
FIG. 14 is a flow chart illustrating the steps for identifying second order crossings within the identification of crossings process, according to an aspect of the present invention.

The next type of crossing is the second order crossing, the process for which is identified at step 350 of FIG. 9. Second order crossings are produced by a higher level analysis of the characteristic lines and associated first order crossings, described above. The procedure necessarily begins by identifying the first order crossings. At step 352 of FIG. 14, groupings of the first order crossing are identified and compared. It is determined at step 354 whether the identified first order crossings within a grouping are separated by a mutual distance at most S4. In an exemplary embodiment of the invention, the threshold S4 is approximately 4 to 32 pixels. If these mutual separations are within S4, then the mutual connections among the first order crossings involved are analyzed at step 356 to determine at step 358 whether there is a pattern of mutual connections. In other words, it is determined whether there is a pattern that can be interpreted as common to two or more characteristic lines of the mutual connections. If so, the grouping is captured as a second order crossing, at step 359.

Figures 15A, 15B, 15C:
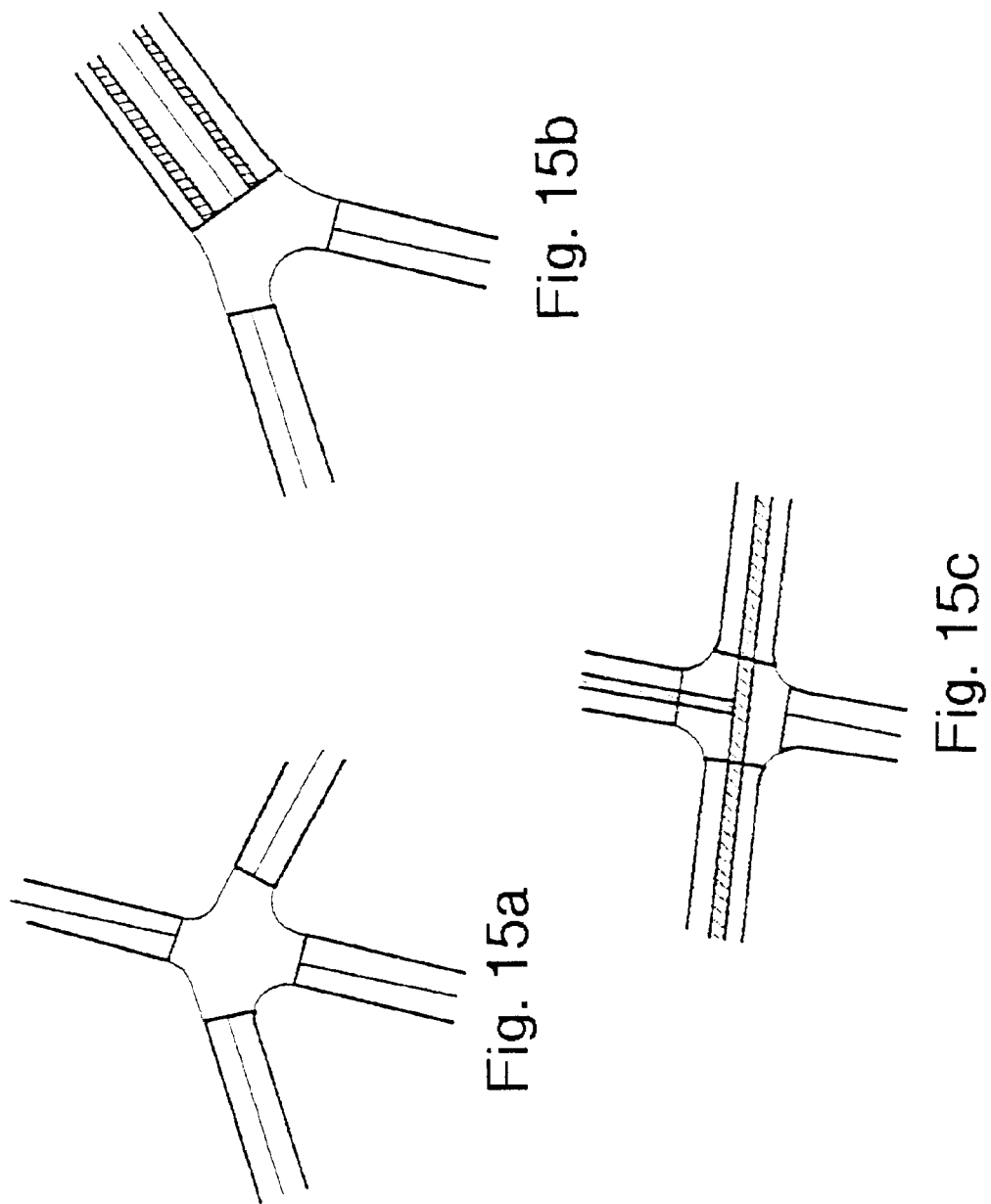
FIG. 15 shows exemplary types of second order crossings, according to an aspect of the present invention.

FIG. 15 shows basic patterns of exemplary second order crossings. FIG. 15(a) shows a second order crossing of four ridges. FIG. 15(b) shows a second order crossing of two ridges and one more complicated characteristic line. FIG. 15(c) shows a second order crossing of one ridge and three more complicated characteristic lines; the brightness patterns of the more complicated characteristic lines project inside the crossing.

Figure 16B:
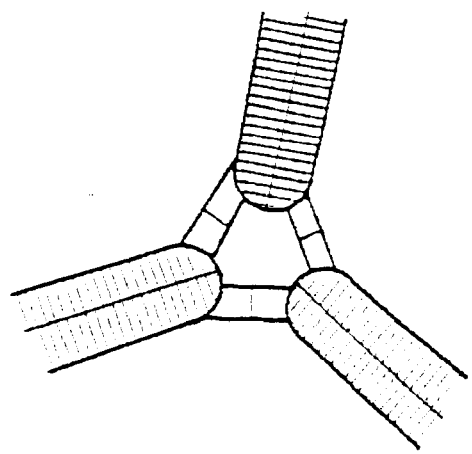
FIG. 16 shows exemplary types of proximities interpreted as crossings, according to an aspect of the present invention.
Figure 16C:
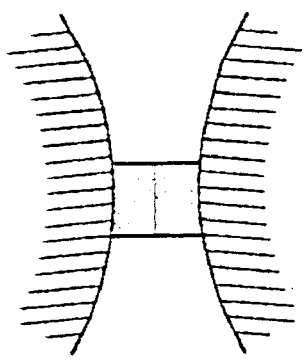
Figure 16A:
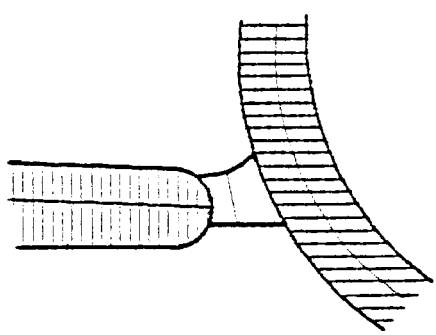

In addition to actual intersections of characteristic lines, proximities meeting certain criteria are also identified as crossings at step 360 of FIG. 9 in the latter stages of the detection process. FIG. 16 shows typical patterns of proximities that are interpreted as crossings. FIG. 16(a) shows a proximity between the end area of one ridge and the side of another ridge. FIG. 16(b) shows a proximity among the respective end areas of three ridges. FIG. 16(c) shows a short proximity between the interior areas of two characteristic lines.

While the geometric proximities of the characteristic lines shown in FIG. 16 are apparent (and have already been detected at this stage of the process), whether these proximities are interpreted as crossings depends on the brightness patterns within the respective proximity areas. As described with respect to step 260 of FIG. 5, when the brightness in a proximity area is perceived as similar to the brightness of the associated characteristic lines and different from the brightness of the background, the proximity is identified as a crossing.

The final step related to identification of crossings is to approximate the crossings by mathematical models at step 370 of FIG. 9. The mathematical model of a crossing is obtained through aggregation of the mathematical models representing the uniform characteristic lines that produce the crossing. However, in an embodiment, the underlying crossing structure is used to simplify and condense these mathematical models. In particular, because the cross-sections of the characteristic lines forming the crossing are mutually dependent, incorporation of this dependency can be used to reduce the number of free parameters. Similar to step 240 of FIG. 3, it may be desirable to simply identify the crossings without approximating them by mathematical models at step 370 of FIG. 9, depending on the intended application.

Figure 17:
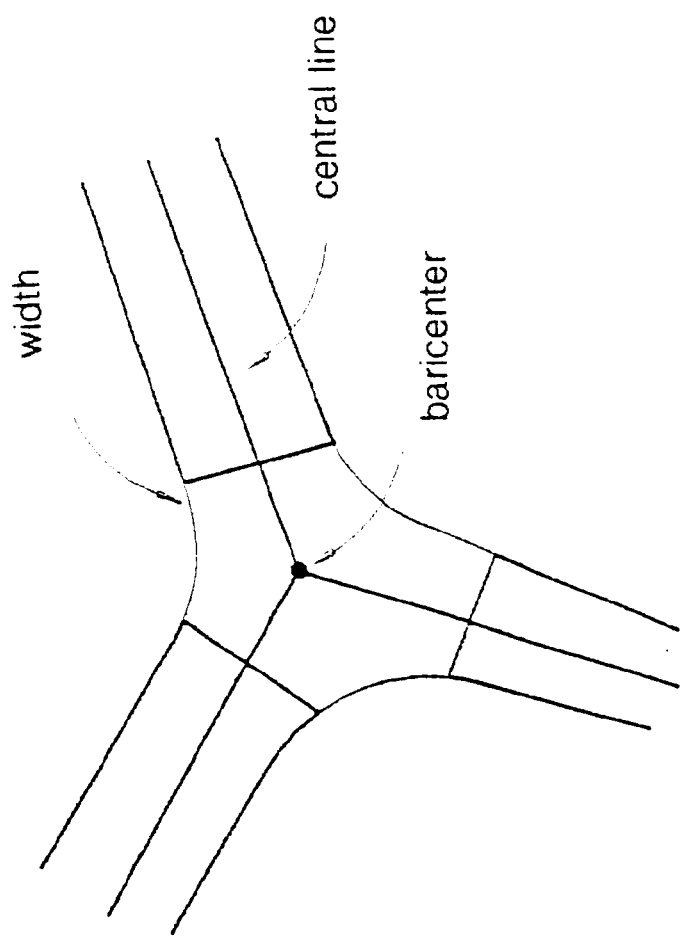
FIG. 17 shows a geometric component of an exemplary crossing mathematical model, according to an aspect of the present invention.

The geometric component of a crossing mathematical model includes a baricenter, the central lines of the participating characteristic lines and the widths of the characteristic lines in the vicinity of the crossing. FIG. 17 shows these elements at the intersection of three exemplary characteristic lines. The baricenter is the intersection point of the center lines of the three characteristic lines producing the crossing. The width of each of the three characteristic lines is shown by the lines running generally parallel to the respective center lines. The brightness component of a crossing mathematical model includes the cross-sections of each of the characteristic lines involved and a polynomial at the baricenter of the crossing. The polynomial approximates the specific brightness pattern at the common part of a crossing.

Background of Image

Once the visually significant relationships among characteristic lines have been captured, i.e., proximities and crossings, the background of the image is identified, as indicated in steps 400 to 600 of FIG. 1. The CORE image representation is improved with the detection and representation of the "background." The background authentically captures several visual patterns that cannot be represented as lines. The first type of background, indicated by the process at step 400, is "slow-scale background," which consists of the image areas having gradual changes in brightness or color. The second type of background consists of "patches" of distinct brightness or color, indicated by the process at step 500. These patches are generally small in scale to the overall image, and visually distinct from the surrounding areas. The third type of background, indicated by the process at step 600, consists of the "textures," which are similar to patches, but demonstrate a pattern. As far as mathematical approximation of the image, the overall background enables aggregation of the various image models, including characteristic lines, patches and textures.

Geometrically, the background is a part of the image that is residual to the previously detected characteristic strips and crossings. In other words, the areas of each of the characteristic strips (to the boundary lines) and the areas identified as crossings are effectively deleted from the image. The margins of the characteristic lines are also part of the background, and therefore form areas over-lap between the background and the corresponding characteristic lines. Proximities are identified as part of the background.

Figure 18A:
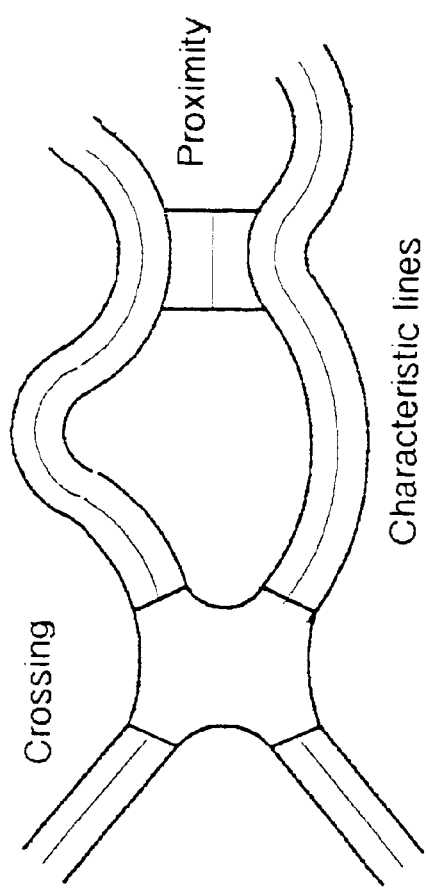
FIG. 18 shows margins and background corresponding to exemplary crossings and proximities, according to an aspect of the present invention.
Figure 18B:
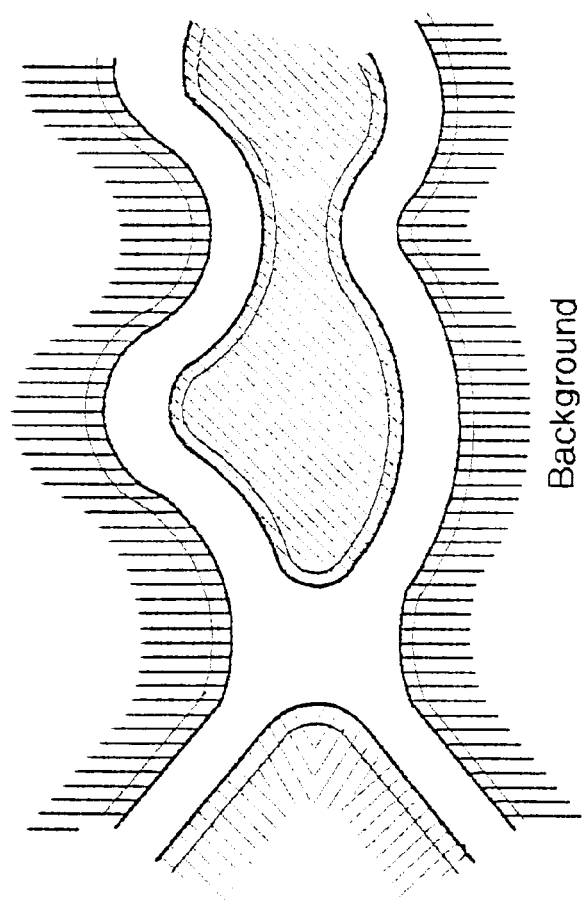

FIGS. 18(a) and (b) depict the background areas captured with respect to exemplary image various parameters related to characteristic lines. FIG. 18(a) shows two characteristic lines intersecting at a crossing on the left and defining an area of proximity on the right. FIG. 18(b) shows, by hatching, the areas identified as background. The background includes the thin margins of the characteristic lines, shown by dashed lines running parallel to the characteristic lines, as well as the entire proximity area. The characteristic lines themselves, including the crossing, are excluded from the background. Thus, geometric identification of the background flows from the adequately captured characteristic lines and associated crossings.

However, approximation of the background by mathematical models presents a number of difficulties. First, the models must capture the image patterns of all three different types of background, i.e, slow-scale areas, patches and textures. Yet, the data describing the background types must be compact enough to provide appreciable data reduction. Second, in order to enable various image processing operations, especially with respect to geometric transformations, the background representation must be "geometrically invariant." In particular, the result of a certain geometric transformation, applied to the image representation, must remain a representation of the same type as the original one. Because characteristic lines, proximities and crossings satisfy this requirement, the background areas, being residual to these objects, are also defined invariantly. However, the invariance of the background representation must be maintained for the brightness representation of the background, as well, thereby excluding explicit use of "pixel cells." These difficulties are addressed, below.

Slow-Scale Background

Figure 19:
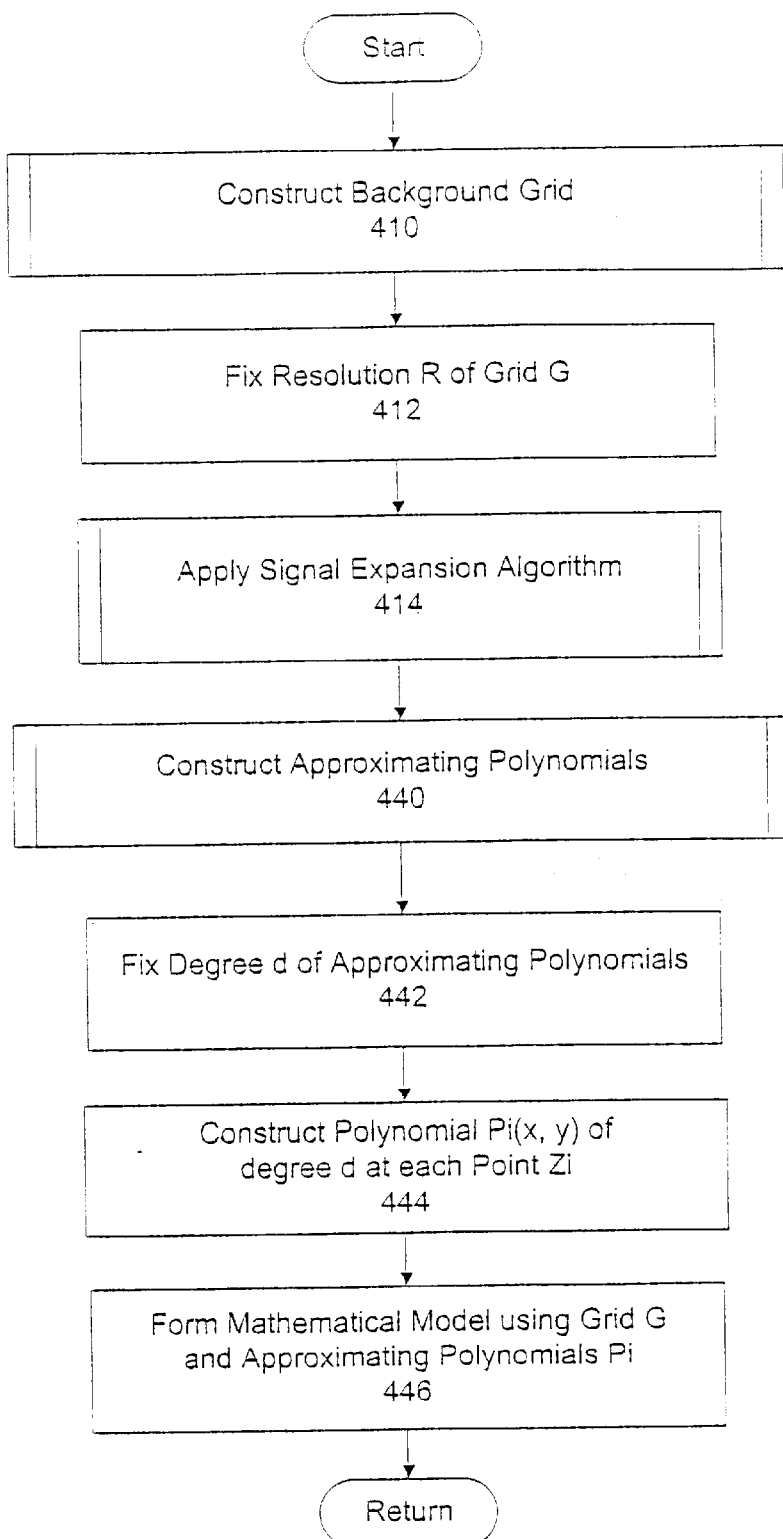
FIG. 19 is a flow chart illustrating the overall identification of slow-scale background process, according to an aspect of the present invention.

Slow-scale background captures visual patterns in the background area that are characterized by a relatively gradual change of the brightness. The process of identifying the slow-scale background is shown in FIG. 19. The brightness of a slow-scale background is stored at the points Zi of a background grid G, in the form of low degree polynomials Pi. Each point Zi corresponds to a pixel of the original image (although every pixel is not necessarily represented by a point Zi).

The process begins as indicated at block 410, constructing a background grid G. First, the resolution of the background grid G is fixed at step 412. The resolution is typically a distance R (e.g., 3 to 32 pixels) between the points of a (non-uniform) grid G, on which the brightness values are represented. The grid G must satisfy the following properties: (i) The distance between any two points of G is at least R/2; (ii) every point of the background area is closer than R to at least one point of G; and (iii) each point of G either belongs to the boundary of the background area, or is not closer than R/2 to the boundary.

Figure 20:
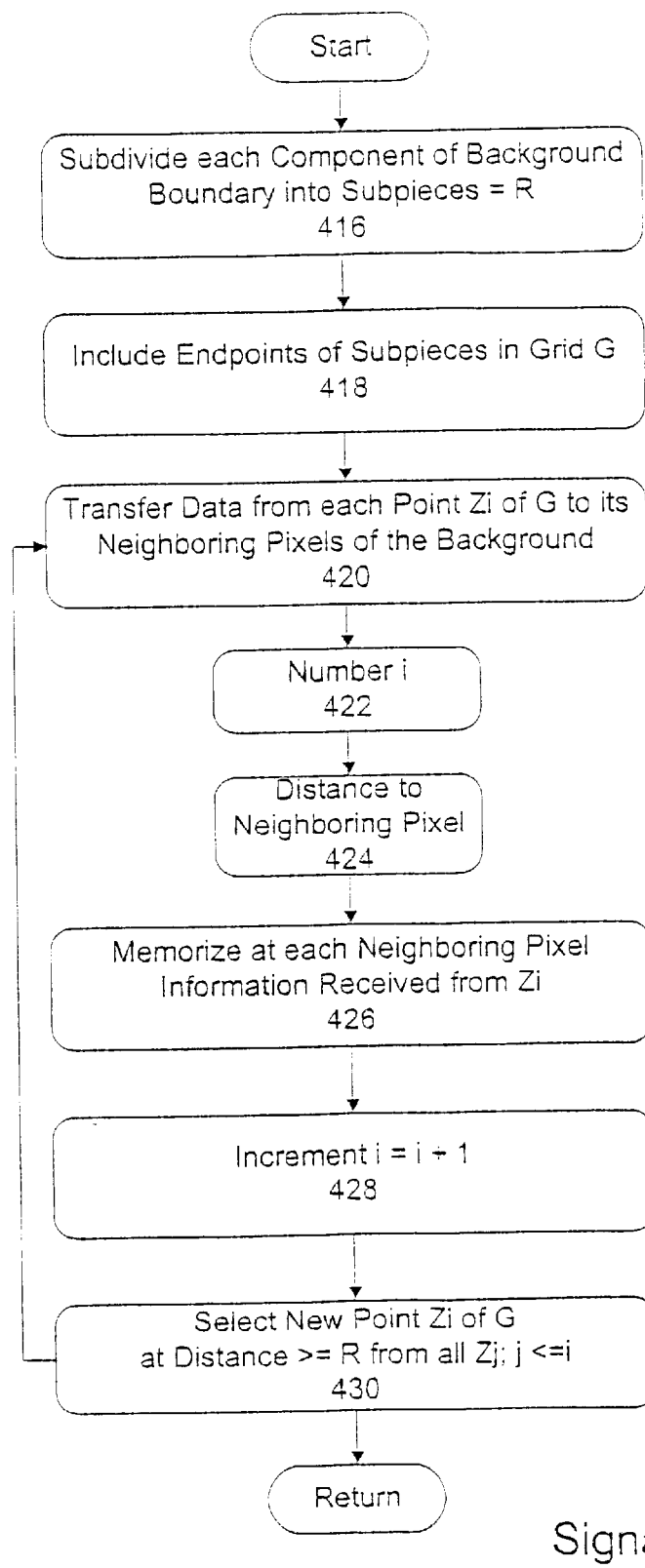
FIG. 20 is a flow chart illustrating the steps for applying the signal expansion algorithm within the identification of slow-scale background process, according to an aspect of the present invention.

A grid G satisfying these requirements is determined using the "signal expansion algorithm," which is a process indicated at step 414 of FIG. 19, and shown in detail in FIG. 20. The signal expansion algorithm is determined by first subdividing each component of the background area boundary into sub-pieces, each having a length of approximately R, at step 416 of FIG. 20. The end points of each sub-piece are included in the grid G at step 418. Next, at step 420, each of the points Zi of G, which have already been identified, transfers location data to neighboring pixels in the background area, up to an exemplary distance of 2R from Zi. The data transfer includes assigning the location data of Zi to the nearest neighboring pixels, which in turn transfer the location data to their respective nearest neighboring pixels, and so on, up to the distance CR from Zi. Only pixels in the background area participate in the location data transfer procedure. The location data transfer includes the number "i" of Zi and the distance from the receiving pixel location, indicated by steps 422 and 424, respectively.

The data transferred is then memorized at each pixel neighboring Zi at step 426. In other words, the data is algorithmically associated with each pixel, for example, in a centralized memory or database. At step 428, the value of i is incremented by 1 and, at step 430, a new point Zi of G is selected from among the pixels that are at least R in distance from any previously chosen point of G, including Zi. Steps 420 to 428 are then repeated for each new point of G. The signal expansion algorithm is terminated when no new point at a distance of at least R can be found from among the already chosen points of G. Hence, after completion of the signal expansion algorithm, each pixel location of the background has memorized the number of, and distance to, each of the grid points Zi that belong to the same connected component of the background.

Although the relationships may be determined as direct computations of data, the signal expansion implementation is more efficient from a processing standpoint. The signal expansion algorithm also preserves the following important property: only those pixel locations belonging to the same background connected component as grid point Zi have "memorized" the number i of the grid point Zi. As a result, each point of a certain connected component of the background area is influenced only by the grid-points located in the same component.

Referring back to FIG. 19, after the background grid has been constructed, approximating polynomials representative of each point Zi must be constructed according to the process beginning at block 440. First, at step 442, the degree d of the approximating polynomials is fixed (e.g., usually d=0,1 or 2). Then, at step 444, a polynomial Pi (x, y) of degree d is constructed at each point Zi of G, providing the best quadratic approximation of the actual brightness values at each background pixel in the disk of radius R, centered at Zi.

In an alternative embodiment, weighted quadratic approximations can be used for each pixel. The straightforward construction of polynomials Pi at step 444 is applicable only where the circle of radius R surrounding each pixel does not touch textured areas, patches or the boundaries of the background. At step 446, the grid G and the polynomials Pi form the mathematical model representing the slow-scale part of the background. The mathematical model includes, for example, a list of all grid points Zi and associated coordinates, as well as a list of the corresponding polynomials Pi, specified by their coefficients.

Background Patches

The next step of the CORE process is to identify the background patches at step 500 of FIG. 1. Background patches are image patterns formed by localized changes of brightness (or color) of the image. Patches preferably have relatively simple shapes and sizes, usually less than the resolution R of the background. In fact, patches are considered part of the background because they are smaller than the resolution R (usually chosen according to the viewing conditions). Hence, image areas with patches are visually perceived as background, such that the dominant brightness value is that of the background with superimposed "patch textures."Consequently, the areas covered by patches are included in the background. The brightness values of the background are computed "under" the patches, and the brightness values of the patches are captured, processed and memorized with respect to the brightness values of the surrounding background.

Figure 21:
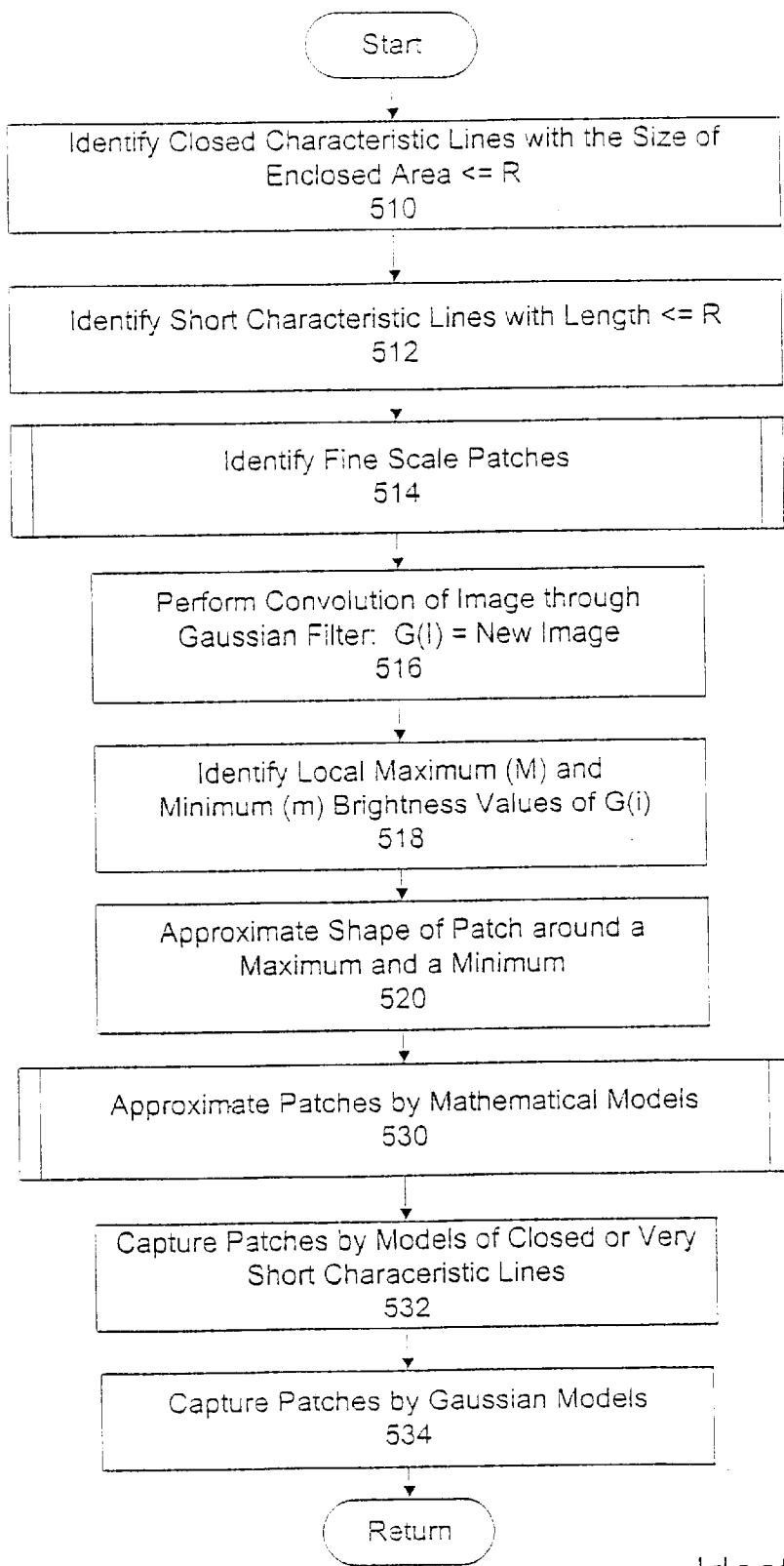
FIG. 21 is a flow chart illustrating the identification of patches process, according to an aspect of the present invention.

FIG. 21 is a flowchart showing the process of identifying background patches. Typically, patches are formed by closed characteristic lines. Thus, as indicated at step 510, if a characteristic line is closed and the size of the enclosed area does not exceed the background resolution R, the enclosed area is identified as a patch. The closed characteristic line also assures that the shape of the patch can be simply approximated, as discussed below.

Figure 22B:
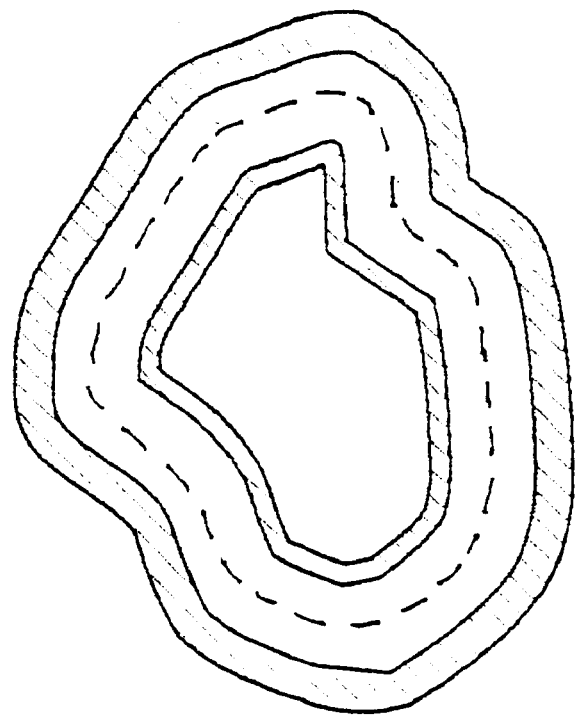
FIG. 22 shows exemplary types of patches and a comparison to a closed characteristic line that is not a patch, according to an aspect of the present invention.
Figure 22A:
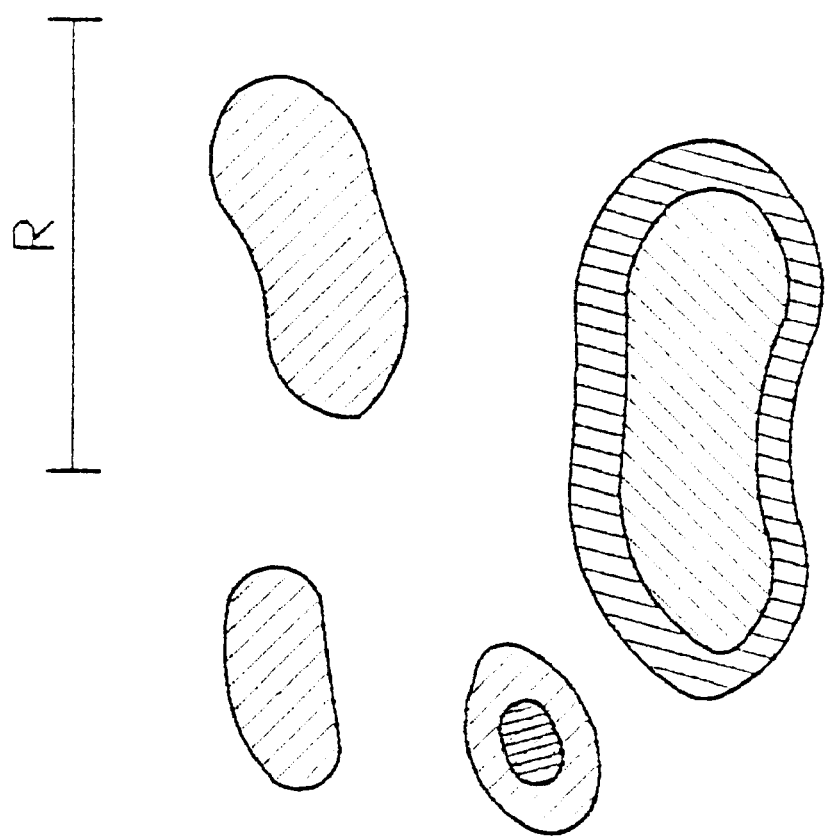

Examples of background patches are shown in FIG. 22. As indicated by the scale, all of the patches in FIG. 22(*a*) are formed by closed characteristic lines less than R in dimension. Usually, patches are formed by simple characteristic lines, such as closed edges. An area of the image encircled by a more complicated characteristic line is usually larger than the allowed size R, as shown by the exemplary closed characteristic line of FIG. 22(*b*), which would not be captured as a background patch.

At step 512 of FIG. 21, image patterns consisting of very short characteristic lines are likewise identified as patches. Again, the characteristic lines must be shorter than the resolution R of the background. FIGS. 23(*a*) and 23(*b*) depict examples of patches of this type. Both FIGS. 23(*a*) and 23(*b*) are less than R in length (and width) and have relatively simple patterns. As in the case of closed characteristic lines, if a very short characteristic line has a complicated pattern, such as the characteristic line of FIG. 23(*c*), it will not be interpreted as a patch. Generally, the width of a characteristic line with a complicated pattern is larger than the allowed amount (resolution R).

Next, fine scale patches are identified by the process beginning at block 514. Fine scale patches are those not captured in steps 510 and 512, above. The process of identifying fine scale patches begins with convoluting the image through a Gaussian filter at step 516. Fine scale patches are captured as local maxima and minima of the brightness of the convoluted image at step 518. Such Gaussian filtering techniques are well known. The shape of the captured patches are then approximated at step 520 by equating the convolution to the background value of the filtered area.

Figure 24:
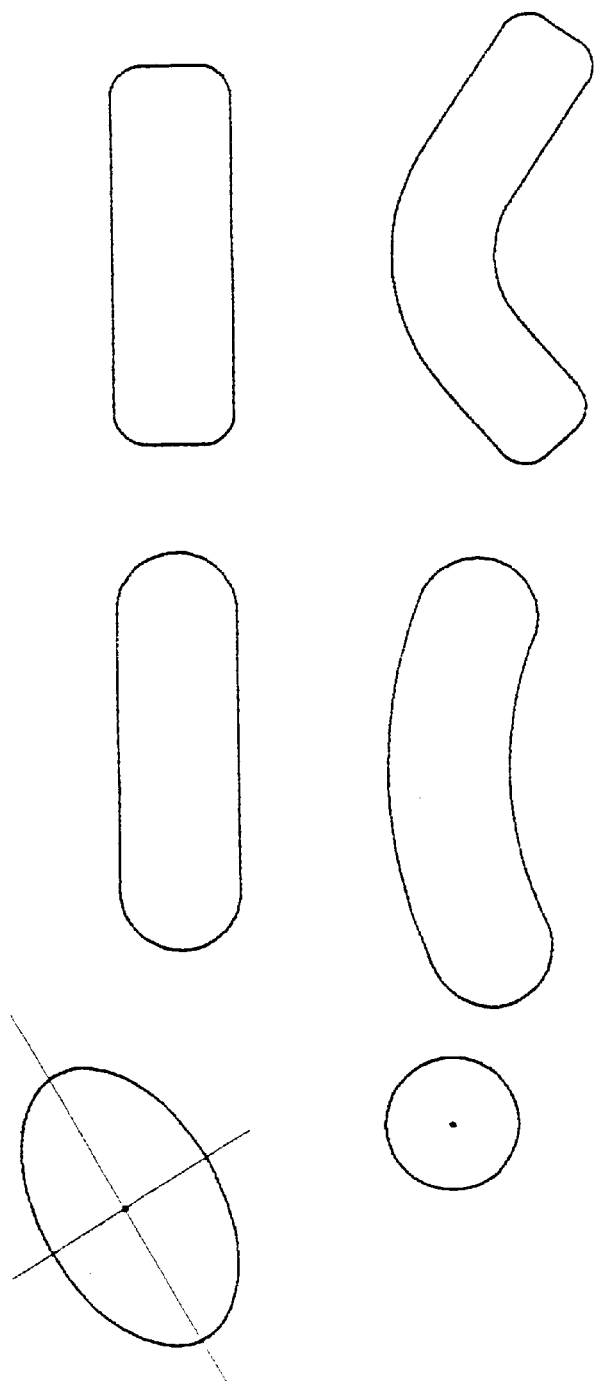
FIG. 24 shows exemplary types of simple models representing patches, according to an aspect of the present invention.

Beginning at block 530, the patches are approximated by mathematical models. Patches identified by closed characteristic lines at step 510 or by short pieces of characteristic lines at step 512 are simply approximated mathematically by the models representing the corresponding characteristic lines. However, because a typical observer's visual sensitivity to image patterns having small angular sizes is rather low, the characteristic line models can be significantly simplified with no visible image distortion. For example, the shape of a characteristic line patch can be adequately approximated by the shapes shown in FIG. 24, which include an ellipse, an elongated ellipse and a bent elongated ellipse. The exemplary model shapes in FIG. 24 may be substituted for the characteristic line patch shapes in the image that are adequately similar in appearance. Similarly, the brightness patterns of characteristic line patches can be approximated by simple models. For patches formed by closed edges, for example, a model incorporating only one brightness value, corresponding to the center of the enclosed area, usually provides an adequate visual representation of the patch.

Fine scale patches, captured by Gaussian filtering, can be approximated mathematically by Gaussian-like models at step 534. Various generally bell-shaped functions may be used in the Gaussian-like models, such as the re-scaled function $e^{-r^2}$ or the re-scaled paraboloid. The value at the center of the patch equals the minimum (or the maximum) of the convolution, and the basis is defined by equating the convolution to the background value at the center of the patch. Regardless of the type of patch, all of the brightness parameters are constructed, stored and processed with respect to the background brightness.

Textures

Next, the various textures of the background are identified in step 600. Step 600 is optional because, in the background models described in reference to steps 400 and 500, any texture can be faithfully and adequately captured and represented by slow-scale background and patches. In many cases, representation by slow-scale background and patches is desirable, as for example, in texture analysis. For example, accurate capturing of position, geometric and brightness parameters of each patch (of a total size of a couple of pixels) in a texture area provides a powerful tool for comparison and identification of geometric, brightness and statistical analysis of textures.

However, for fine scale textures, analysis of an undesirably large number of patches may be necessary for appropriate image representation (e.g., thousands of patches for a 500×700 pixel image). If the application involves compact representation and processing of an image, and does not involve detailed image analysis and texture identification, representation of textures by patches is visually redundant. Indeed, the shape and brightness of each fine element of texture is explicitly memorized, even though ordinary visual perception of texture is well known to ignore such detail, and instead focuses on certain "integral" characteristics. For example, representation of an image in frequency domains (Fourier transform and modifications) provides a faithful and compact representation of textures, well tailored to the visual perception of a typical observer.

The requirement of natural applicability of geometric transformations, which is basic in CORE representation, implies that each element of CORE must be spatially localized. Well known wavelet representation schemes are therefore useful because they combine representation in frequency domains with spatial localization of basic elements. The CORE process incorporates any one of the wavelet systems, known in the art, for example, the systems described in ISO standard MPEG 4 and JPEG 2000 specifications, and in Eric G. Stollnitz, et al., "Wavelets for Computer Graphics, Theory and Application." However, these systems are applied in CORE only to textures with a typical scale finer than the resolution R of the background. Elongated image patterns (e.g., characteristic lines) have been excluded from the background at the first stage of the CORE algorithm.

Also, the slow-scale background is usually subtracted from the texture pattern to be represented. Consequently, the wavelet basis is reduced. In particular, all the basis elements are omitted with a wavelength larger than R and/or with the spatial size larger than CR (at least in one direction) are omitted, where C is a predetermined constant, e.g., between 1 and 4. This reduction of the wavelet basis allows for a much more efficient and compact representation of textures than in a direct wavelet representation of the initial image.

Figure 25:
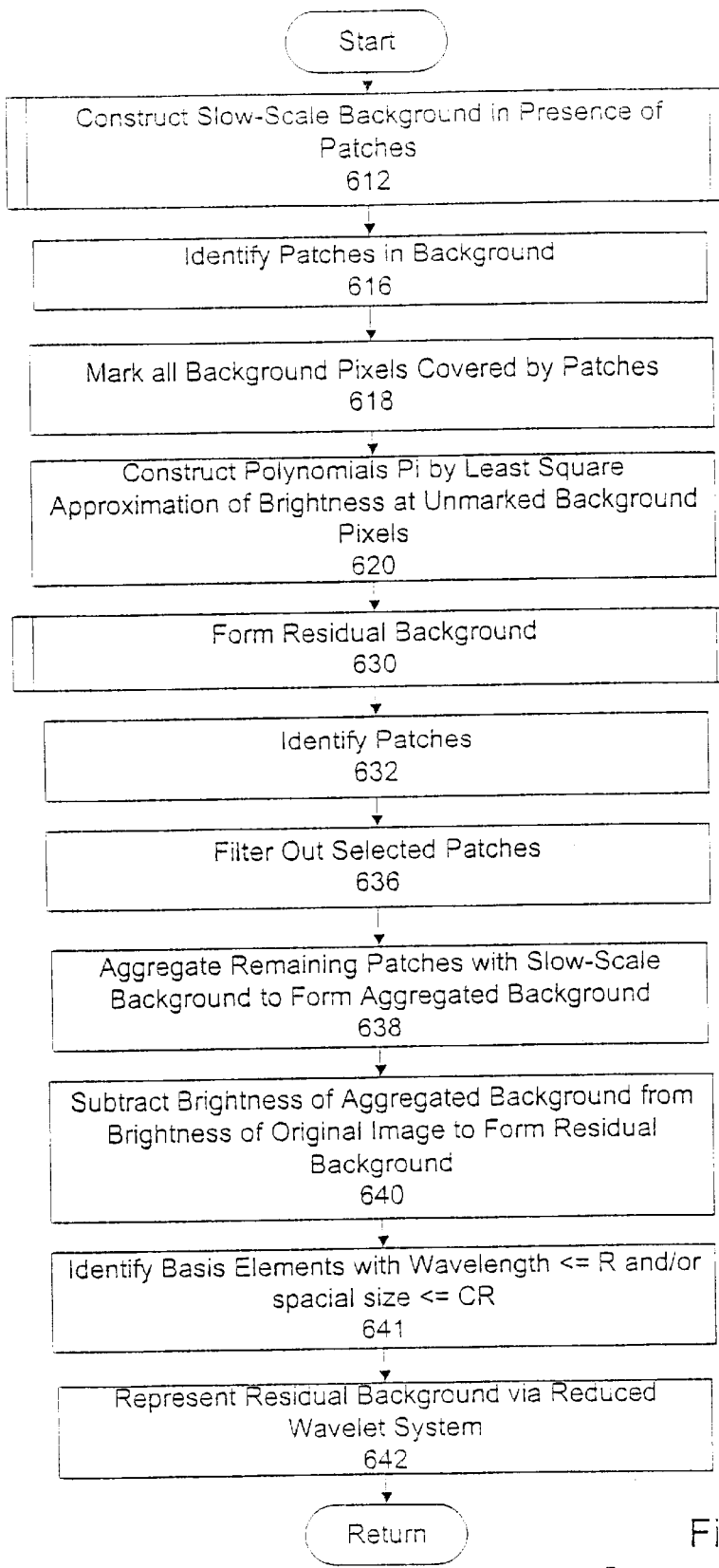
FIG. 25 is a flow chart illustrating the capturing of textures process, according to an aspect of the present invention.

FIG. 25 shows a process for capturing textures of the image. The slow-scale background is first constructed in the presence of patches, as indicated by block 612. The construction of approximating polynomials Pi at the grid-points Zi of the background grid G must be modified. The polynomials cannot be constructed by the least square approximation of the brightness values at all pixels of the background because they would also reflect the brightness pattern of patches and textures, which usually differ significantly from the slow-scale background. Instead, the area covered by patches is excluded from the approximation. This is done in several steps. First, at step 616, the patches in the background area are identified, and at step 618 the background pixels covered by these patches are marked. At step 620, the polynomials Pi are constructed by the least square approximation of the brightness at all the non-marked background pixels. In an alternative embodiment, the marked pixels can be included in the approximation with small positive weights.

A residual background is then formed, beginning at block 630. As explained above, patches form a faithful representation of textured areas. However, in order to reduce visually irrelevant information, patches can be replaced by wavelets. This replacement is accomplished by filtering some of the patches. Some of the patches are "filtered out" at step 636 according to the size of the patch and the difference between the brightness of the patch and the brightness of the slow-scale background at the same point. For example, patches smaller than 3 pixels and having less than 10 grey values in brightness difference from the background may be filtered out.

At step 638, the remaining patches are aggregated with the slow-scale background. The aggregation is performed in the same manner as the general aggregation of mathematical models, described below. The brightness of the aggregated background is subtracted from the brightness of the original image at step 640 to form the residual background. The basis elements must then be identified at step 641 that have a wavelength less than or equal to R or a spacial size less than or equal to CR. Finally, the residual background is represented at step 642 via the wavelets system with the reduced basis.

The background representation of steps 400 to 600 satisfies the requirement of invariance with respect to geometric transformation. All of the elements of the background are characterized by their shape and position on the image, with no reference to pixel cells or other structure irrelevant to the visual content of the image. Thus, the geometric transformations consist simply of computing the transformed values of geometric parameters. This is also true for the elements of the wavelet basis, since they are provided with the center coordinates and the shape descriptions.

Reconstruction of Background

Figure 26:
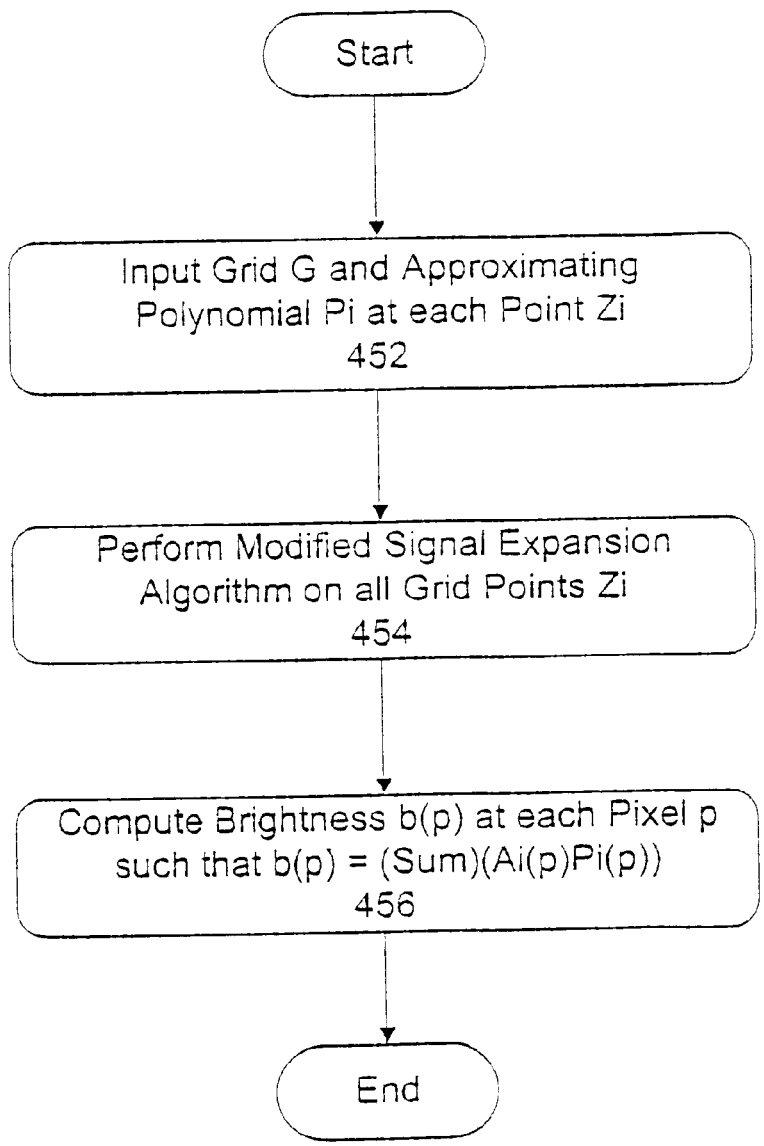
FIG. 26 is a flow chart illustrating the reconstruction algorithm for the image background areas, according to an aspect of the present invention.

Reconstruction of the brightness values of the background from the framework of its mathematical model is accomplished through a "reconstruction algorithm," shown in FIG. 26. The reconstruction algorithm begins by obtaining as input the background grid points Zi and the approximating polynomial Pi at each point Zi at step 452. Then, at step 454, a portion of the signal expansion algorithm is performed (i.e., steps 420 to 428 of FIG. 20) for all of the grid points Zi, except that the data transferred and memorized by each background pixel includes the number of and the distance to the "emitting" grid-point Zi, as well as the coefficients of the associated polynomial Pi.

At step 456, the brightness b(p) at each pixel p of the background area is computed according to the following formula:

$$b(p)=(\text{Sum})Ai(p)Pi(p)$$

where,
  p=background pixel;
  Pi(p)=value of polynomial at p; and
  Ai="partition of unity" weight function for p, satisfying the following:
    Ai are positive functions (usually depending only on distance to Zi); and
    The sum of Ai(p), over the indices stored at p, is equal to 1 for any p.

The summation runs over all of the indices i memorized for each pixel p. The values of the polynomials Pi(p) are computed for each pixel p using the coefficients of Pi, memorized in relation to p. Construction of the partition of unity Ai is well known in the art. These functions are generally chosen to satisfy the following additional requirements:
  Ai(Zi)=1
  Ai(p)=0
where
  the distance of p to Zi>CR, and
  C=a constant (e.g., between 1 and 4).

The reconstruction algorithm can be specifically organized to enhance efficiency. For example, a signal of each grid point Zi is transmitted only a maximum distance of CR from Zi (assuming that Ai satisfies the additional requirements, above). Also, the values of Ai and Pi are computed directly at each pixel in the signal expansion steps, using "incremental formulae," which are well known in the art. Direct computation of Ai and Pi renders transmission of the coefficients of Pi unnecessary. The result is recreating the brightness of each pixel from the mathematical model of the background.

Aggregation of Mathematical Models

The mathematical models of basic images parameters have been constructed, including characteristic lines, proximities and crossings of the characteristic lines, and the background. These models enable reconstruction of the brightness value for each pixel belonging to the various domains. In order to provide a final mathematical representation of the image, the various mathematical models must be aggregated with one another according to the process at step 700 of FIG. 1.

Figure 27:
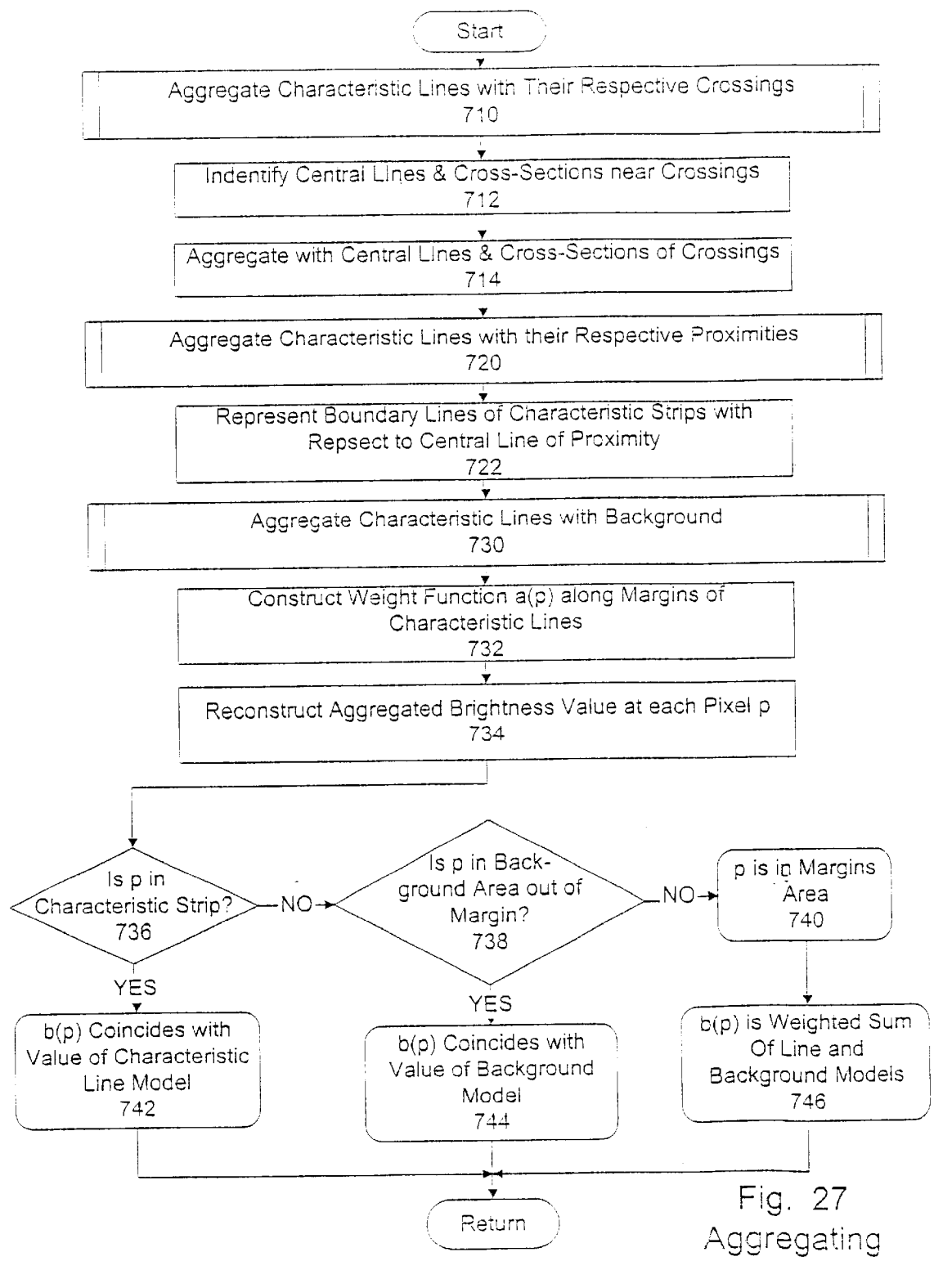
FIG. 27 is a flow chart illustrating the aggregation of mathematical models process, according to an aspect of the present invention.

FIG. 27 is a flowchart showing the steps of aggregating the mathematical models of the basic image parameters. As indicated by the process beginning at block 710, the models of the characteristic lines are aggregated with the models of their respective crossings. Specifically, the central lines and the cross-sections of the characteristic lines in the vicinity of each crossing are identified at step 712. At step 714, the identified central lines and cross-sections are aggregated with the central lines and the cross-sections stored in the mathematical model of the crossing. Specifically, the corresponding endpoints of the characteristic lines, and the cross-sections at these endpoints are replaced with the corresponding endpoints and cross-sections stored at the crossings.

The characteristic lines are then aggregated with their proximities beginning at block 720. Specifically, the boundary lines of the characteristic strips in the vicinity of each proximity are represented with respect to the central line of the proximity, indicated at step 722. In an embodiment of the invention, the boundary lines are represented in a coordinate system associated with the proximity. The coordinate system includes two coordinates, s and d, which are the position of the orthogonal projection of a selected point onto the central line of the proximity and the distance of the point to the central line, respectively.

Steps 710–722 of the aggregation process present a significant advantage over conventional image representation systems. The crossings and the proximities of characteristic lines visually serve as "organizing centers" of the image. Ordinary human visual perception is highly sensitive to brightness and shape of the organizing centers. If geometric transformations or quantization of geometric parameters is performed independently on each characteristic line, without explicitly taking into account the respective crossings and proximities (i.e., without aggregation), visual distortions may appear. Steps 710–722 of FIG. 27 prevent these types of visual distortions.

As indicated at block 730, the mathematical models of the characteristic lines are aggregated with the mathematical models of the background. The background aggregation is performed along the margins of the characteristic lines. (The margins also belong to the background). A "weight function" a(p) is constructed at step 732, such that a(p) is equal to "one" on the boundary lines of characteristic lines and decreases toward the exterior side of the margins (equaling 0 at the exterior limit of the margin).

The aggregated brightness value for each pixel p of the image is then reconstructed at step 734 as follows: At step 736, it is determined whether the pixel p is in one of the characteristic strips. In an embodiment of the invention, the boundaries of the characteristic strips are identified by the spline curves. A signal expansion algorithm, in which each pixel transmits a signal to its neighboring pixels without crossing the boundaries of the characteristic strips, provides an efficient method for marking pixels in each characteristic strip and in each component of the background. If the pixel p is in one of the characteristic strips, then the value of b(p)

is set to coincide with the value of the brightness in the characteristic line model at step 742. If the pixel p is not in a characteristic strip, it is similarly determined at step 738 whether p is in the background area of the image. If p is in the background, then the value of b(p) is set to coincide with the background model value for p in the background area out of the margins at step 744. Otherwise, p is determined to be in the margin area of the image at step 740 and the value of b(p) is set equal to a weighted sum of the brightness values of the characteristic line model and the background model at step 746 (having the weights a(p) and 1-a(p), respectively).

Globalization and Localization

Efficient implementation is important to CORE applications, especially for applications dependent on real-time processing, such as video, and applications that include restricted processing and memory resources like imaging for cellular phones. It is therefore desirable to organize the processing locally with respect to the image, thus minimizing computing power and memory requirements and simplifying data flow. Also, it is essential to have parallel realization of the computations, especially, for example, in hardware implementations.

The algorithms described in relation to FIG. 1 and the associated processes are semi-local in nature. In other words, to determine the type of image element or mathematical model at a certain point of the image, only information concerning the immediate vicinity of the point need be analyzed. CORE representation, however, is basically global, so piecemeal processing of an image can create difficulties, unless the processing is organized to preserve the global nature of the resulting CORE data.

In the present invention, complete global CORE representation of an image is accomplished without artificially subdividing the image into cells. This represents a vast improvement of the prior art. Simultaneously, computer implementation of the present invention can be efficiently organized in local form. The problem of reconciling global representation and local data processing is solved through "globalization."

The globalization process is depicted in the flow chart of FIGS. 28(*a*) and 28(*b*). With respect to uniform characteristic lines, the globalization procedure is initiated by covering the image with overlapping processing sections according to the process beginning at block 810. The size and shape of these sections, which are not relevant to final mathematical modeling, are determined by implementation restrictions at step 812. These restrictions include, for example, the size of available computer memory and the cache memory. The size of each overlapping portion of the sections must be at least double the "locality size." The locality size, in turn, is the size of the neighborhood that influences the identification of a model at any fixed point. Generally, the locality size is the maximum of the applicable distance thresholds (e.g., the threshold S with respect to proximities, discussed above) used in the algorithm. The thresholds used in identifying characteristic lines, described in U.S. patent application Ser. No. 09/716,279, filed on Nov. 21, 2000, discussed above, must also be taken into account.

At step 830, each processing section is processed independently, according to the processes described with respect to FIG. 1. The processes provide visually faithful representations of the respective sections by the detected models. Therefore, even where a particular characteristic line falls within two sections of the image, for example, it will be represented in a visually consistent manner in both sections.

Figure 29C:
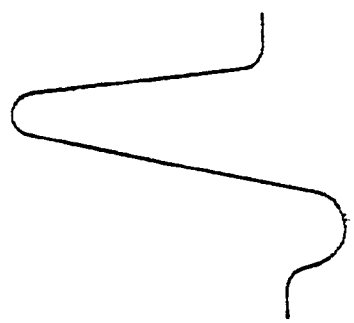
FIG. 29 shows graphical depictions of alternative geometric models representing the same characteristic line, according to an aspect of the present invention.
Figure 29B:
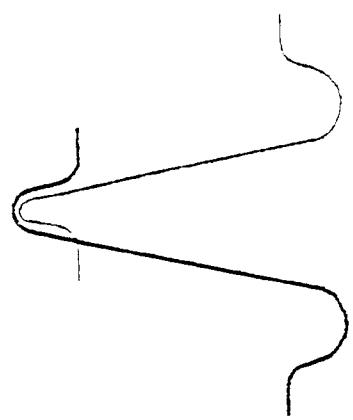
Figure 29A:
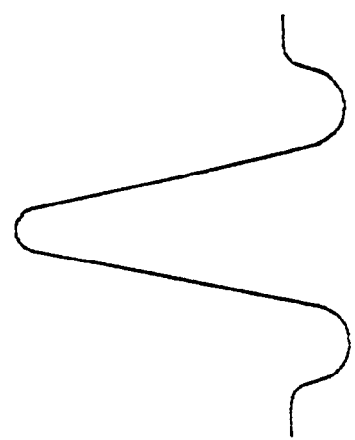

However, for a characteristic line in two sections, the types, central lines and cross-sections of the corresponding models, may differ. Indeed, a characteristic line can be faithfully represented by multiple types of models, as shown, for example, in FIG. 29. FIG. 29(*a*) shows a ridge represented by a ridge model, depicted by a ridge cross-section. FIGS. 29(*b*) and 29(*c*) show equivalent models of the same ridge, which provide equally accurate image parameters. In particular, FIGS. 29(*b*) and 29(*c*) depict the ridge represented by two edge models and one edge model with a strongly deformed profile, respectively. Another possibility is that a characteristic line is represented by the same model type in overlapping processing sections, but each section has a type with slightly differing cross-sections. While each cross-section, alone, provides a sufficiently accurate approximation of the characteristic line, the interconnection among more than one cross-section may result in visual discontinuity.

Globalization of such non-conforming models and/or cross-sections is resolved by "cross-section interpolation," initiated at block 840. At step 842, the various models, which represent the same characteristic line in overlapping processing sections, are identified. For example, a single characteristic line within two overlapping sections may be represented by two different models. Identifying the models is accomplished by identifying common parts of the corresponding characteristic strips. At step 844, a "representative point" is chosen on the central line of each of the two models, at a distance approximately 1.2 to 1.8 times the locality size from the boundary of the corresponding processing section. This guarantees that the model is completely defined at the representative point. The representative points of the various models, coming from multiple processing sections, are then joined by spline segments at step 846. The corresponding cross-sections of the representative points are interpolated between the models at step 848.

In cases where the two models of the characteristic line are of the same type (with different cross-sections), the resulting "joint model" is of the same type with corresponding cross-sections at the representative points. In the case where the two models are of different types (or in the case of non-uniform characteristic lines), they are interpreted as aggregations of uniform lines, as described in patent application "Method and Apparatus for Image Analysis and Processing by Identification of Characteristic Lines and Corresponding Parameter," U.S. patent application Ser. No. 09/716,279, filed on Nov. 21, 2000, and interpolation is performed separately for each of the uniform lines involved.

After globalization of the characteristic lines, the background is globalized, beginning at block 860 of FIG. 28(*b*). To globalize the background, a background grid G is constructed separately at each of the processing sections, together with approximating polynomials, at step 862. Patches are identified separately at each of the processing sections at step 864. At step 866, textures are identified and represented by a wavelet basis separately at each of the processing sections. Step 866 is optional, however, in that textures may be adequately captured as patches, as described above.

By the process beginning at block 868, "filtering" is performed on the overlapping portions of the processing sections. The filtering includes omitting grid-points of a joined grid at step 870, the omission of which does not violate the conditions on the grid, described with respect to FIG. 19. The points of the joined grid are checked and deleted, one after another, until the conditions are satisfied. At step 872, the approximating polynomials corresponding to the omitted grid-points are likewise deleted. The same filtering is performed with respect to the patches and wavelets identified in overlapping processing sections at step 874, i.e., the patches and wavelets are either identified with one another or deleted.

Reconstruction of the brightness values of the image for each pixel starting with CORE representation has been described above for each of the mathematical models and for final aggregation of the mathematical models. However, the efficiency of the reconstruction process is also affected by reconciling the global nature of CORE data and the requirement of locality in processing. Efficient implementation of the reconstruction process (on a computer with a limited memory and computing resources or, alternatively, on a parallel computer) is achieved by a localization procedure.

Figure 28A:
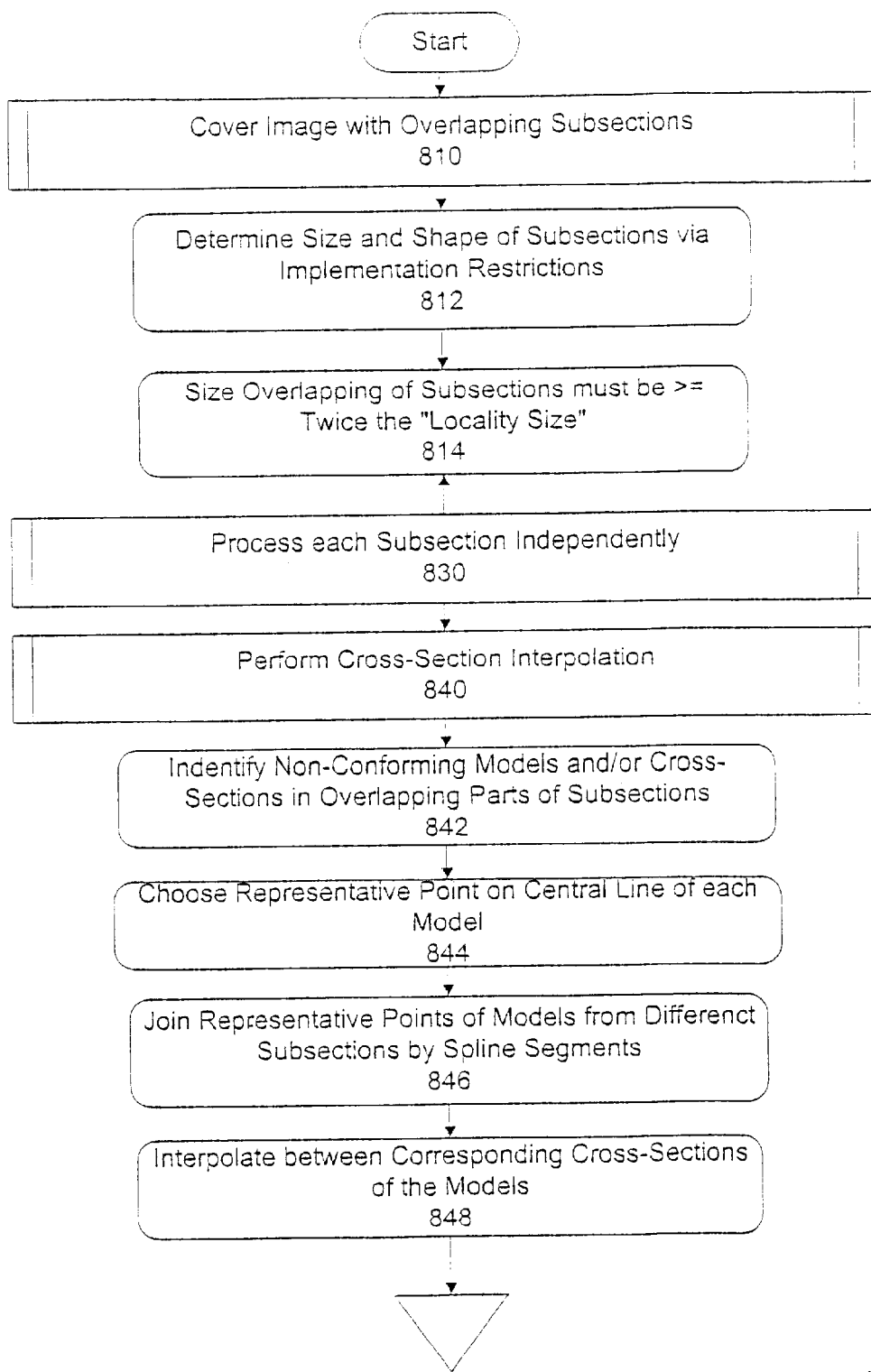
FIGS. 28(a) and 28(b) is a flow chart illustrating the globalization process, according to an aspect of the present invention.
Figure 28B:
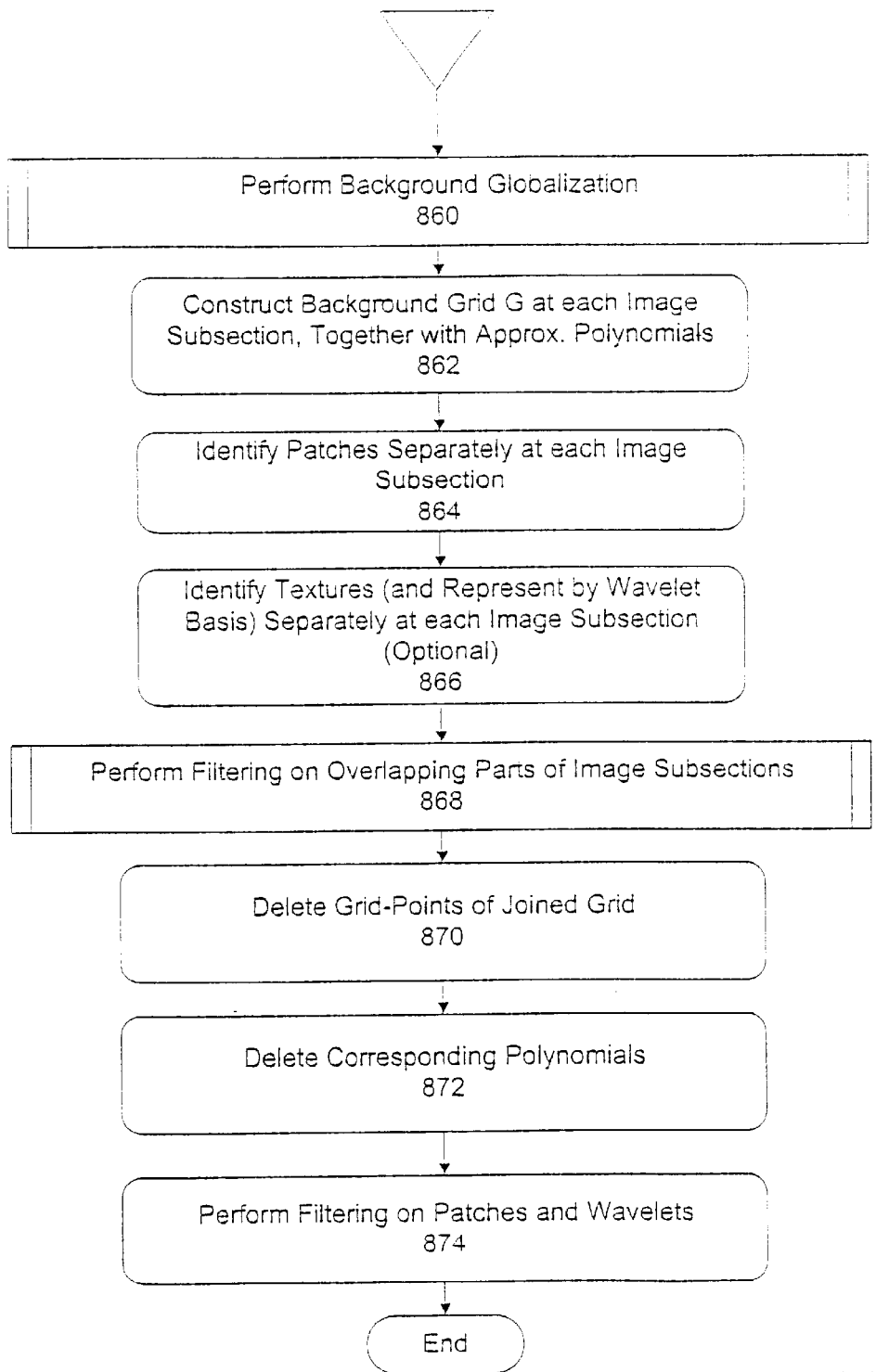
Figure 30:
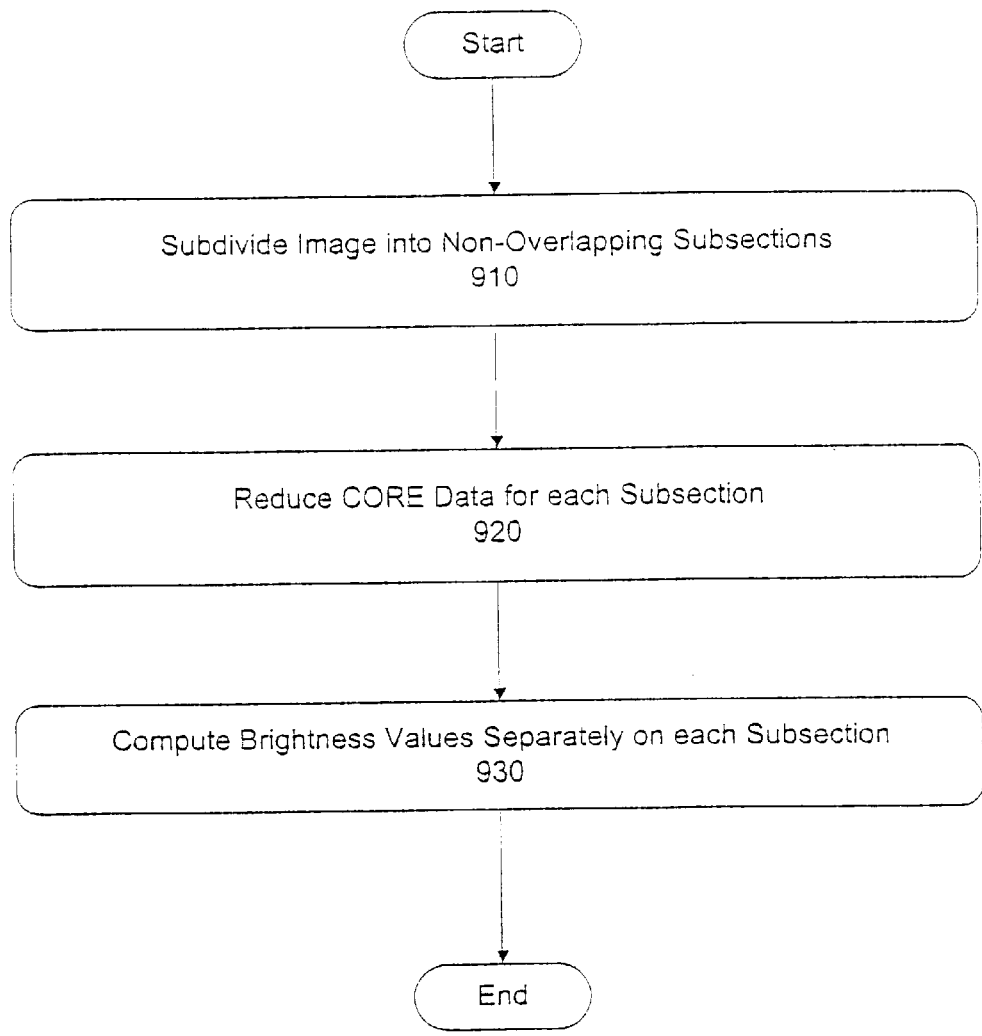
FIG. 30 is a flow chart illustrating the localization process, according to an aspect of the present invention.

The localization process of FIG. 30 sets forth a process that is essentially opposite to the globalization process of FIGS. 28(a) and 28(b). Localization is performed by first subdividing the image by non-overlapping processing sections at step 910. The "CORE locality size" has been defined above as the maximum distance at which CORE data can influence image brightness. At step 920, the CORE data are "reduced" for each processing section, which preserves only aspects of the mathematical models that influence brightness of the processing section. Specifically, only those parts of the CORE models are retained that are closer to the processing section than the CORE locality size. The brightness values are then computed separately on each processing section at step 930, as described above.

Superimposing CORE Images

The CORE representation process is the same regardless of the image source. Therefore, CORE representations of the same scene based on different image types provide numerous practical advantages. The different image types include, for example, standard black and white or color images, produced by digital photography and video, or by digitally scanning photographs or videos. There are also images based on sensor data, such as laser depth, infrared, x-ray and ultrasound images. Many image types are generated from complicated computations, such as computed tomography (CT) scan imaging, magnetic resonance imaging (MRI), ultrasound and molecular computations.

CORE representation of the same scene produced as different image types provides alternative perspectives of the scene. In other words, two images showing the same object or scene, as captured by two different sensors, have the same characteristic lines, proximities and crossings, geometrically. However, the signatures of these parameters may differ. In other words, the geometry of characteristic lines, and of their proximities and crossings, are defined by the scene itself, while the signatures are additionally defined by the perception of the scene by the specific type of sensor. The same is true for patches and textures in the image background. The position and shape of these image elements (i.e., the geometric components) are the same, while the respective brightness components differ from sensor type to sensor type.

Figure 31B:
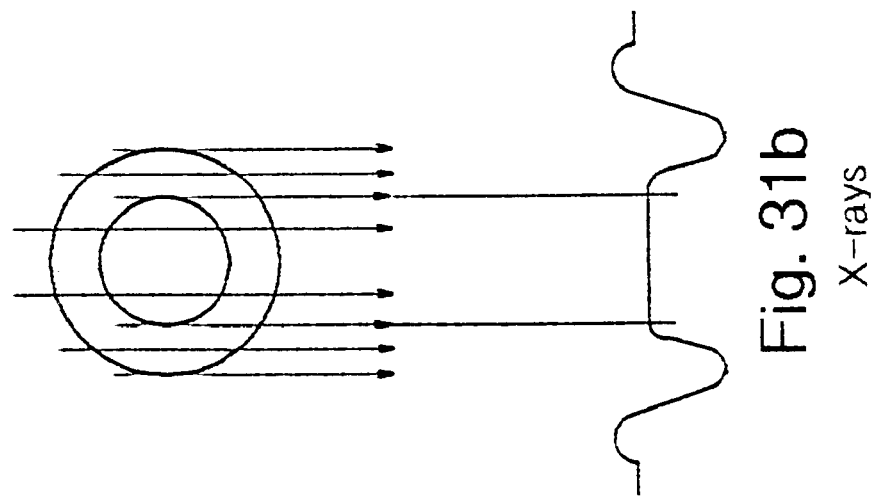
FIG. 31 shows graphical depictions of pipe cross-sections, represented by photographic and x-ray images, respectively, according to an aspect of the present invention.
Figure 31A:
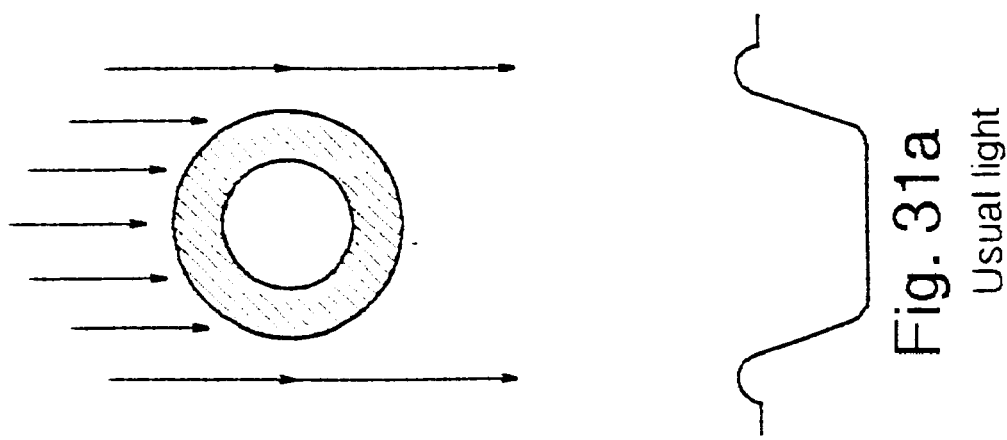
Figure 32:
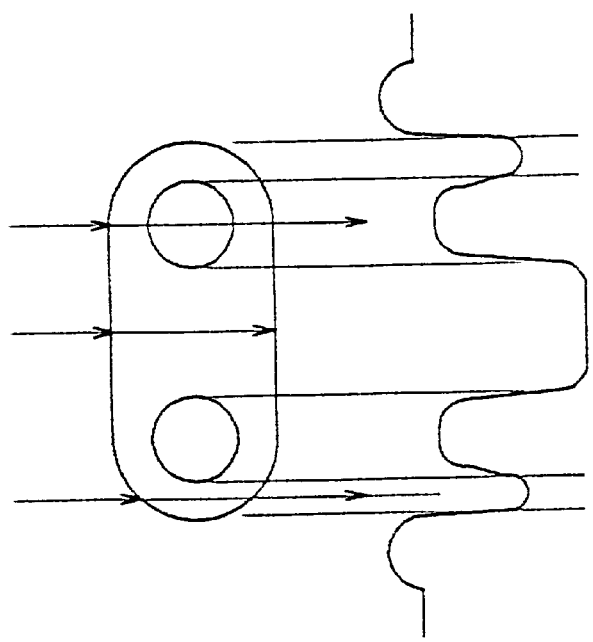
FIG. 32 shows graphical depictions of pipe cross-sections, represented by an x-ray image, according to an aspect of the present invention.

For example, an image of a thin pipe results in generally the same characteristic lines, whether produced by a standard digital color photograph or an x-ray. However, the respective signatures of these characteristic lines, shown in FIG. 31, are quite different. FIG. 31(a) depicts a cross-section view of the pipe, as illuminated by normal light and captured by standard photographic imaging. The resulting signature (below the cross-section) reflects the fact that the light is blocked by the solid portions of the pipe. In comparison, FIG. 31(b) depicts a cross-section view of the same pipe subject to x-ray imaging. Although the geometry is the same as FIG. 31(a), the resulting signature differs significantly since the x-rays are not blocked by the solid portions of the pipe, but rather are captured by variations in brightness. By aligning the geometric aspects of the image to superimpose FIG. 31(a) and FIG. 31(b), structural characteristics may be analyzed by comparison of the signatures. Similarly, FIG. 32 shows the cross-section of an x-ray image of a pipe having two holes. Again, the brightness of the x-ray image is proportional to the total density of the material.

Furthermore, CORE representation may be used for "tuning" various image sources. For example, FIG. 33 shows tuning of a scanner for a camera that generates standard digital images. While the characteristic lines remain geometrically the same for different tunings, the cross-sections vary significantly. FIG. 33(a) shows typical edge and ridge cross-sections for a normal scanner tuning and FIG. 33(b) shows edge and ridge cross-sections for an "over-sharp" tuning. Comparison of an empirical cross-section and a known desired cross-section can be used to enhance tuning efficiency (i.e., alignment of the empirical cross-section with the desired cross-section indicates accurate tuning).

CORE representation also has significant practical application to quality inspections. For example, characteristic lines with a variety of signatures appear in a visual inspection of electronic devices (e.g., microprocessors and printed circuit boards). However, photographing the same electronic device using an infra-red camera (especially in working mode) will produce completely different cross-sections of the same characteristic lines. Comparison of the images identifies anomalies in the manufactured product.

CORE representations of multiple images of the same scene, based on different sensors from the same viewpoint, are combined by first CORE representing one of the images to obtain the geometric and brightness components. Usually, the image that captures the scene with the most clarity and detail is used as the initial image. The geometric components for the image elements of the initial image are then incorporated into the CORE representation of subsequent images. The brightness components are then determined for the subsequent image elements. The brightness components include, for example, the cross-sections corresponding to the identified characteristic lines, proximities and crossings, as well as the approximating polynomials corresponding to the grid points of the slow-scale background. Significantly, all of the operations involving only the geometric components of the scene are performed once, for the initial image, while the brightness components are processed separately for each of the images from different sensors. This assures the compatibility and integrity of the geometric components.

The combined CORE representation may represent different color separations of the same color image in a common digital format, such as bitmap format (BMP). For example, in the BMP format, three color separations R (red), G (green) and B (blue) are stored with 8 bits accuracy at each pixel. Combined CORE representation of these three separations, as described above, significantly simplifies processing and improves compression because the geometric data need only be compressed and processed for one of the three color separations.

Also with respect to color separations, CORE representations provide additional advantages, which take into account human color visual perception. In particular, the R, G, B color separations can be transformed into the Y, I, Q separations by a well known linear transformation. For most images, the Y (luma) separation carries most of the "brightness energy." Therefore, the initial CORE represented image (i.e., the initial color separation), for which both the geometric and the brightness components are identified, is preferably the Y separation. Then, only brightness components are separately identified for the I and Q separations, which require less processing. Furthermore, it is well known that human visual sensitivity to the I and Q separations is much lower than to the Y separation. Consequently, the brightness data of I and Q can be stored with less detail (and on a courser scale) than the brightness data of the Y separation. Therefore, less data and memory is needed to represent the CORE represented color image.

CORE Implementation

The generated image components, including characteristic lines, proximities, crossings and background, are encoded individually and as groups, sets, and/or models into a readable and writable digital file format. A computer programmer of ordinary skill will recognize how to form the digital file format, and the organization thereof is non-critical. The file format may be in any decodable format, such as a coded text format (e.g., similar to the manner of encoding of a PostScript vector file), or a binary format for more compact encoding. In specialized applications, the file format may be replaced by a streaming or transmittable bit stream format.

The file format is readable by an imaging decoder, which may take the form of a stand-alone program, a "plug-in" for an image interpreting program (such as a Photoshop plug-in), a "codec" for an image displaying program (such as Quicktime or Windows Media Player), a Dynamic Link Library, a programmed or programmable gate array, or other known means of interpreting and reassembling encoded image information for display or analysis. The file format is also readable by an analysis decoder, which may take similar forms to those above, but which reconstructs the image in memory or in an interpreted form that is not an image (histograms, vector representations, etc.). In an embodiment, the invention is included in wireless image applications. For example, an image generator is adopted for use in wireless devices and file formats are adopted for transmission via wireless networks.

Figure 34:
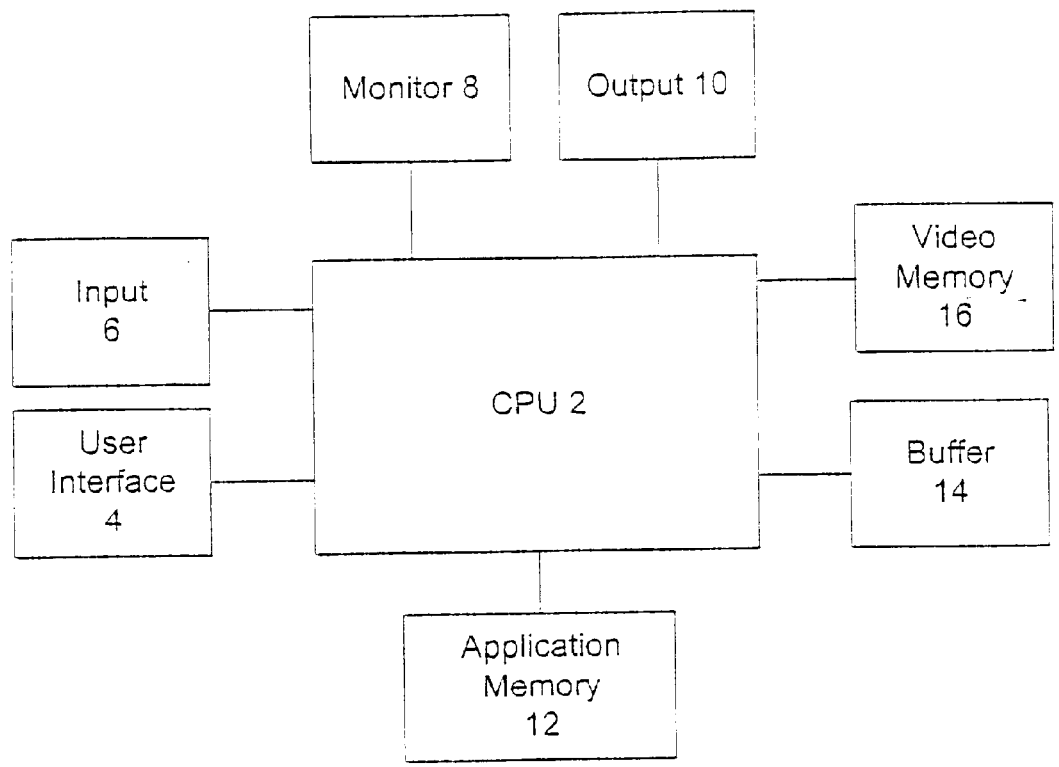
FIG. 34 shows a block diagram of an exemplary computing apparatus and system, according to an aspect of the present invention.

In an embodiment of the invention, the method described herein is implemented by a computer system that executes a computer program comprising each of the steps necessary for representing the digital image. A computer programmer of ordinary skill will recognize how to carry out the programming necessary to encode the methods described in detail herein. Referring to FIG. 34, an exemplary computer system includes a central processing unit (CPU) 2, operating (for example) a personal computer (not pictured) and capable of executing the program. In one embodiment of the invention, a general purpose standalone computer, running a consumer or enterprise operating system, is used. The program consists of computer readable code compatible with the CPU 2, which executes the program implementing the method. The program is accessible by the CPU 2 through a RAM memory, and may be read from and written to a conventional hard disk drive or any other peripheral or internal data storage medium. The digital image files of the file format discussed above are also read from and written to either or both of internal memory and the noted data storage medium, and may also be received and transmitted via a network connection (not shown).

The system can include conventional peripheral computer equipment, such as typical user interface devices 4, including a keyboard and a mouse. Necessary input for those routines described herein as interactive may be provided via the keyboard and mouse. Other CPU input 6 includes any direct source of digital imaging, such as a digital camera, scanner or a facsimile machine. Typically, the computer program will also be able to import a variety of bitmap and vector image file formats (e.g., JPEG, GIF, PNG, TARGA, TIFF, PDF), as well as graphic file formats and storage formats that may also be represented by the method described herein but are not conventional "images" (e.g., map data, interferometry data, graphs of any kind, solid models, finite element analysis representation, flow diagrams of any kind, etc.). In a commercial setting, exemplary CPU input 6 could also include digital image data from medical imaging devices such as x-ray, MRI, and PET, oscilloscopes and industrial process controllers.

Similarly, the system incorporates any number of compatible graphic output devices and other output devices. User interface and interactive processing is facilitated by incorporation of a monitor 8. Other standard graphic output devices 10 are incorporated in embodiments of the invention, depending on the desired application, including a printer, a facsimile device or a modem. Furthermore, commercial uses may necessitate incorporation of alternative output devices. For example, the method may be implemented for pattern detection. An empirical cross-section of a pattern boundary detected according to an aspect of the invention can be compared with "sample" cross-sections (stored in a database) to accomplish visual comparison and inspection in tolerance sensitive manufacturing processes, such as printing of microelectronic circuits. Therefore, an exemplary output device of CPU 2 would include an automated controller (not pictured) used to maintain calibration of a manufacturing process. In another example, the output can be used to tune a sensor, which compares the empirical cross-sections of characteristic lines on a sensor image produced with a "standard" or "calibrated" cross-section.

The CPU 2 incorporates in an exemplary embodiment sufficient memory to carry out the functions described herein, for the purpose of explanation shown herein as three separate memories. The application memory 12 stores the executable program for processing the digital image. The video memory 16 retains the digitally defined pixel image currently displayed, including the source image and feedback indicators for interactive processes (colored indications and marks as described). The buffer 14 accommodates images under processing and model portions while the program "builds" the mathematical model through execution of the program. Generally, a flexible amount of other memory is used for accommodating active processes and necessary data. For example, with respect to FIG. 4, the program must generate substantial data to perform the scanning, ordering and comparing operations related to the spline segments. As this data is generally process enabling and extraneous to the end product (i.e., the mathematically captured/converted characteristic line representations), the intermediate data may be swapped in and out of the buffer 14 as necessary and may be directly manipulated therein.

Although certain processes described herein involve comparison of one element to all other elements (e.g., each pixel compared to each remaining pixel of an image, each endpoint of a line compared to each remaining endpoint, each endpoint compared to all spline segments, and other intensive successive one-to-all comparisons), optimization by reducing the set of elements to be compared is within the spirit and scope of the invention. For example, when each endpoint of a line is compared to the remaining endpoints to determine elementary crossings, the set of remaining endpoints can be reduced to those within a reasonable proximity in view of the circumstances. This applies to both local and global processes. Elements examined can be sorted, grouped and/or ranked to facilitate processing of nearby or more critical relative elements. Coordinates and other values can also be transformed to determine whether or not the corresponding element will be examined. Furthermore, memory and storage requirements are reduced by similar methods. Such optimization is considered within the ordinary skill of a person in the art and within the ordinary skill of a computer programmer, and is merely subsidiary to the main processes.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A method for representing an image comprising:
    identifying a plurality of characteristic lines of the image;
    identifying visual relationships among the plurality of characteristic lines, the visual relationships comprising proximities and crossings; and
    defining a background of the image, the background comprising slow-scale background and background patches;
    wherein identifying the crossings comprises:
        identifying elementary crossings based on at least geometric adjacencies among endpoints and spline segments of a plurality of edges and ridges;
        identifying first order crossings based on at least a detection of intersecting characteristic lines among the plurality of characteristic lines;
        identifying second order crossings based on at least a detection of identified first order crossings within a predetermined distance of one another; and
        identifying proximity crossings based on proximities that are less than a predetermined distance in length.

2. The method for representing an image according to claim 1, wherein identifying the proximities comprises:
    identifying boundary lines corresponding to each of the plurality of characteristic lines;
    approximating each boundary line by spline curves;
    subdividing each spline curve into a plurality spline segments, each spline segment being less than a predetermined number of pixels in length;
    processing the plurality of spline segments to determine and mark couples of joined spine segments; and
    defining proximity intervals based on at least one chain of couples.

3. The method for representing an image according to claim 2, wherein identifying the proximities further comprises:
    approximating each proximity interval by a proximity interval center line that adjoins boundaries of the proximity interval; and
    determining a mathematical model of the proximity interval based on a mathematical model of a proximity interval characteristic line defined by the proximity interval center line.

4. The method for representing an image according to claim 1, further comprising:
    assembling mathematical models representing the plurality of characteristic lines, the visual relationships and the background, respectively; and
    aggregating the mathematical models representing the plurality of characteristic lines with the mathematical models representing the visual relationships among the plurality of characteristic lines and the background of the image.

5. The method for representing an image according to claim 4, further comprising:
    performing at least one of storing, transmitting and processing data representing the mathematical models.

6. The method for representing an image according to claim 4, wherein identifying the background patches of the image comprises:
    identifying closed characteristic lines that enclose an area less than or equal a predetermined size;
    identifying short characteristic lines that have a length less than or equal to a predetermined distance; and
    identifying fine scale patches, comprising convoluting the image through a Gaussian filter; identifying at least one of a local maximum value and a local minimum value; and approximating a fine scale patch shape around the at least one local maximum value and local minimum value.

7. The method for representing an image according to claim 6, further comprising:
    approximating the background patches as mathematical models by determining mathematical modes corresponding to ,the identified closed characteristic lines and the identified short characteristic lines;
    approximating the fine scale patches as mathematical models by determining corresponding mathematical models of at least one of a re-scaled Gaussian function and a re-scaled paraboloid.

8. A method for representing an image comprising:
    identifying a plurality of characteristic lines of the image;
    identifying visual relationships among the plurality of characteristic lines, the visual relationships comprising proximities and crossings;
    defining a background of the image, the background comprising slow-scale background and background patches;
    assembling mathematical models representing the plurality of characteristics lines, the visual relationships and the background, respectively; and
    aggregating the mathematical models representing the plurality of characteristic tines with the mathematical models representing the visual relationships among the plurality of characteristic lines and the background of the image,
    wherein identifying the slow-scale background of the image comprises:
        constructing a background grid comprising fixing a resolution of the background grid and identifying a plurality of points within the background grid; and
        constructing a plurality of approximating polynomials representative of each point of the plurality of points within the background grid based on a predetermined degree for the polynomials;
    wherein the mathematical model representing the slow-scale background comprises the plurality of points and the corresponding plurality of approximating polynomials.

9. The method for representing an image according to claim 8, wherein the identifying the plurality of points within the background grid comprises a signal expansion algorithm, the signal expansion algorithm comprising:

identifying a boundary of the slow-scale background;

dividing the background boundary into subpieces having a predetermined length;

including in the background grid the boundary endpoints associated with each of the subpieces;

identifying a plurality of points to be included in the background grid, each point being at least a first predetermined distance from all other points of the plurality of points and the boundary endpoints;

transferring location data from the each point of the plurality of points and each boundary endpoint to data structures of neighboring points, the neighboring points comprising all other points of the plurality of points, all other boundary endpoints and pixels that are located within a second predetermined distance of each point of the plurality of points and each boundary endpoint;

storing in relation to the neighboring points the transferred location data in the receiving data structures.

10. The method for representing an image according to claim 9, further comprising:

reconstructing a brightness of the background, wherein reconstructing comprises retrieving for each point within the background grid the corresponding approximating polynomial; performing a signal expansion algorithm for each point without crossing boundaries corresponding to the plurality of characteristic lines, computing a brightness value correlating to each point; and translating the brightness value to a corresponding pixel of the represented image.

11. The method for representing an image according to claim 8, wherein identifying the crossings comprises:

identifying elementary crossings based on at least geometric adjacencies among endpoints and spline segments of a plurality of edges and ridges;

identifying first order crossings based on at least a detection of intersecting characteristic lines among the plurality of characteristic lines;

identifying second order crossings based on at least a detection of identified first order crossings within a predetermined distance of one another; and identifying proximity crossings based on proximities that are less than a predetermined distance in length.

12. The method for representing an image according to claim 1, wherein identifying the crossing further comprises:

determining mathematical models of the crossings based on mathematical models of the characteristic lines that form the crossings.

13. A method for representing an image comprising:

identifying a plurality of characteristic lines of the image;

identifying visual relationships among the plurality of characteristic lines, the visual relationships comprising proximities and crossings;

defining a background of the image, the background of the image comprising slow-scale background, background patches and textures, wherein identifying the textures comprises:

identifying patches in the background;

marking pixels located within the identified patches;

constructing polynomials based on a least square approximation of a brightness value of pixels that have not been marked as being located within the identified patches;

filtering out selected patches based on a predetermined size limit and a difference between a brightness of the patches and a brightness of the slow-scale background at each of the points within the patches;

aggregating patches other than the filtered out patches with the constructed polynomials;

determining a difference between a brightness of the aggregated patches and a brightness of the image to form a residual background; and representing the residual background via a wavelets system.

14. A method for representing an image comprising:

identifying a plurality of characteristic lines of the image;

identifying proximities between at least two of the plurality of characteristic lines based on a chain of coupled spline segments, the spine segments being derived from boundary lines corresponding to each of the at least two characteristic lines and being less than a predetermined length;

identifying crossings between at least two of the plurality of characteristic lines, the crossing comprising elementary crossings based on at least geometric adjacencies among endpoints of a plurality of edges and ridges, first order crossings based on at least a detection of the plurality of characteristic lines and identifying second order crossings based on at least an image pattern that is common to more than one of the identified first order crossings;

identifying a slow-scale background of the image based on a signal expansion algorithm performed on a plurality of points within a background grid and a plurality of approximating polynomials representative of each of the plurality of points within the background grid;

identifying background patches of the image based on identification of at least one of closed characteristic lines enclosing an area less than a predetermined size and short characteristic lines having a length less than a predetermined distance;

determining mathematical models corresponding to the plurality of characteristic lines, the proximities, the crossings, the slow-scale background and the background patches; and aggregating mathematical models to represent the image.

15. The method for representing an image according to claim 14, further comprising defining textures, wherein defining textures comprises marking pixels located within the identified patches; constructing polynomials based on a least square approximation of brightness values corresponding to pixels that have not been marked; filtering out selected patches based on size and brightness parameters;

aggregating patches not filtered out with the constructed polynomials; determining a difference between a brightness of the aggregated patches and a brightness of the image to form a residual background; and representing the residual background via a wavelets system.

16. A method for globally representing an image comprising:

covering the image with a plurality of overlapping subsections, each subsection having a predetermined size and shape, wherein the size is greater than or equal to a locality size;

processing each subsection independently, the processing of each subsection comprising:

identifying a plurality of characteristic lines in the subsection; identifying visual relationships among the plurality of characteristic lines, the visual relationships comprising proximities and crossings;

assembling mathematical models representing the plurality of characteristic lines and the visual relationships, respectively; and aggregating the mathematical models representing the plurality of characteristic lines with the mathematical models representing the visual relationships among the plurality of characteristic lines;

determining for each of the plurality of characteristic lines-in each overlapping portion of the subsections whether a non-conforming model exists for the same characteristic line in the overlapping portion;

interpolating among the non-conforming models;

defining a background of the subsections, the background comprising slow-scale background and background patches; and filtering overlapping portions of the subsections.

17. The method for globally representing an image according to claim 16, wherein the interpolating among non-conforming models in each overlapping portion of the subsections comprises:

choosing a first representative point on a central line corresponding to each characteristic line in a first subsection having a non-conforming model of the characteristic line in at least a second subsection that overlaps the first subsection;

choosing a second representative point on a central line corresponding to the characteristic line in the second subsection;

joining by a spline segment the first representative point and the second representative point; and determining at least the cross-section of the spine segment to represent at least an interpolated cross-section of the characteristic line.

18. The method for globally representing an image according to claim 16, wherein the defining the background of the subsections comprises:

constructing a background grid in each image subsection, comprising fixing a resolution of the background grid and identifying points within the background grid, wherein the identifying points comprises performing a signal expansion algorithm;

constructing a plurality of approximating polynomials representative of each point in the subsection background grid based on a predetermined degree for the polynomials;

identifying background patches of each image subsection, comprising identifying closed characteristic lines that enclose an area less than or equal a predetermined size; identifying short characteristic Lines that have a length less than or equal to a predetermined distance; and identifying fine scale patches, comprising convoluting the image through a Gaussian filter, identifying at least one of a local maximum value and a local minimum value, and approximating a fine scale patch shape around the at least one local maximum value and local minimum value; and identifying background textures of each image subsection comprising marking pixels located within the identified background patches in the image subsection; constructing polynomials based on a least square approximation of a brightness value of pixels that have not been marked as being located within the identified patches; filtering out selected patches based on a predetermined size limit and a difference between a brightness of the patches and a brightness of the slow-scale background at each of the points within the patches; aggregating patches not filtered out with the constructed polynomials; determining a difference between a brightness of the aggregated patches and a brightness of the image to form a residual background; and representing the residual background via a wavelets system.

19. The method for globally representing an image according to claim 18, wherein the filtering of overlapping portions of the subsections comprises: deleting grid points of the overlapping portions of each subsection wherein the following conditions are maintained:

a distance between any two points of the grid is at least R/2, where R comprises the resolution of the grid;

every grid point is closer than R to at least one other grid point; and every grid point is one of belonging to a boundary of the background or being farther than R/2 from the boundary of the background;

deleting all redundant representations of the background patches of each image subsection; and deleting all redundant representations of the background textures of each image subsection.

20. A computing apparatus for implementing representation of a digital image, comprising:

a computing device for executing computer readable code;

an input device for receiving the digital image and interfacing with a user, said input device being in communication with said computing device;

at least one data storage device for storing computer data, said data storage device being in communication with said computing device; and a programming code reading device that reads computer executable code, said programming code reading device being in communication with said computing device;

wherein the computer executable code causes the computing device to: identify a plurality of characteristic lines of the digital image; identify proximities between at least two of the plurality of characteristic lines based on a chain of coupled spline segments, the spline segments being derived from boundary lines corresponding to each of the at least two characteristic lines and being less than a predetermined length;

identify crossings between at least two of the plurality of characteristic lines, the crossings comprising elementary crossings based on at least geometric adjacencies among endpoints and spine segments of a plurality of edges and ridges, first order crossings based on at least a detection of intersecting characteristic lines among the plurality of characteristic lines, second order crossings based on at least a detection of identified first order crossings within a predetermined distance of one another, and proximity crossings based on proximities that are less than a predetermined distance in length;

identify a slow-scale background of the digital image based on a signal expansion algorithm to identify a plurality of points within a background grid and a plurality of approximating polynomials representative of each of the plurality of points within the background grid;

identify background patches of the digital image based on identification of at least one of closed characteristic lines enclosing an area less than a predetermined size and short characteristic lines having a length less than a predetermined distance;

determine mathematical models corresponding to the plurality of characteristic lines, the proximities, the crossings, the slow-scale background and the background patches; and aggregate mathematical models to represent the digital image; and wherein the computer executable code causes data representing at least one of the plurality of characteristic lines, the proximities, the crossings, the slow-scale background, the background patches and the mathematical models to be stored in the at least one data storage device.

21. The computing apparatus for implementing representation of a digital image according to claim 20, wherein the computer executable code further causes the computing device to define textures, wherein defining textures comprises marking pixels located within the identified patches; constructing polynomials based on a least square approximation of brightness values corresponding to pixels that have not been marked; filtering out selected patches based on size and brightness parameters; aggregating patches not filtered out with the constructed polynomials; determining a difference between a brightness of the aggregated patches and a brightness of the digital image to form a residual background; and representing the residual background via a wavelets system.

22. A computing apparatus for implementing representation of a digital image, comprising:

a computing device for executing computer readable code;

an input device for receiving the digital image and interfacing with a user, said input device being in communication with said computing device;

at least one data storage device for storing computer data, said data storage device being in communication with said computing device; and a programming code reading device that reads computer executable code, said programming code reading device being in communication with said computing device;

wherein the computer executable code causes the computing device to: cover the digital image with a plurality of overlapping subsections, each subsection having a predetermined size and shape, wherein the size is greater than or equal to a locality size;

process each subsection independently, the processing of each subsection comprising identifying a plurality of characteristic lines in the subsection; identifying visual relationships among the plurality of characteristic lines, the visual relationships comprising proximities and crossings; assembling mathematical models representing the plurality of characteristic lines and the visual relationships, respectively; and aggregating the mathematical models representing the plurality of characteristic lines with the mathematical models representing the visual relationships among the plurality of characteristic lines;

determine for each of the plurality of characteristic lines in each overlapping portion of the subsections whether a non-conforming model exists for the same characteristic line in the overlapping portion;

interpolate among the non-conforming models;

define a background of the subsections, the background comprising slow-scale background and background patches; and filter overlapping portions of the subsections; and wherein the computer executable code causes data representing at least one of the plurality of characteristic lines, the visual relationships among the plurality of characteristic lines and the background of the digital image to be stored in the at least one data storage device.

* * * * *